United States Patent
Borja et al.

(10) Patent No.: US 12,478,971 B2
(45) Date of Patent: Nov. 25, 2025

(54) OPTICAL PLATE CONTROLLER AND READER

(71) Applicant: QUIVER HOLDINGS INC., Cambridge, MA (US)

(72) Inventors: Gabriel Benito Borja, Boston, MA (US); Steven Nagle, Cambridge, MA (US); Christopher Werley, Cambridge, MA (US); Yang Lu, Cambridge, MA (US); Adam Barnett, Cambridge, MA (US); Owen McManus, Belmont, MA (US); Graham T. Dempsey, Cambridge, MA (US)

(73) Assignee: QUIVER HOLDINGS INC., Cambridge, MA (US)

( * ) Notice: Subject to any disclaimer, the term of this patent is extended or adjusted under 35 U.S.C. 154(b) by 882 days.

(21) Appl. No.: 17/563,415

(22) Filed: Dec. 28, 2021

(65) Prior Publication Data

US 2022/0203372 A1  Jun. 30, 2022

Related U.S. Application Data

(60) Provisional application No. 63/132,919, filed on Dec. 31, 2020.

(51) Int. Cl.
| | | |
|---|---|---|
| *B01L 9/00* | (2006.01) | |
| *B01L 3/00* | (2006.01) | |
| *G01N 21/25* | (2006.01) | |
| *G01N 33/50* | (2006.01) | |
| *G01N 35/00* | (2006.01) | |
| *G01N 35/02* | (2006.01) | |

(52) U.S. Cl.
CPC ............. *B01L 9/523* (2013.01); *B01L 3/5085* (2013.01); *G01N 21/253* (2013.01); *G01N 33/5044* (2013.01); *G01N 35/0099* (2013.01); *G01N 35/028* (2013.01); *B01L 2300/0829* (2013.01)

(58) Field of Classification Search
CPC ... G01N 2021/6419; G01N 2021/6421; G01N 21/6428
See application file for complete search history.

(56) References Cited

U.S. PATENT DOCUMENTS

| | | | |
|---|---|---|---|
| 3,975,084 A | 8/1976 | Block | |
| 5,169,601 A * | 12/1992 | Ohta | G01N 33/5302 422/942 |
| 6,740,865 B1 | 5/2004 | Rushbrook et al. | |
| 6,825,921 B1 | 11/2004 | Modlin et al. | |
| 7,113,285 B2 | 9/2006 | Katzingler et al. | |

(Continued)

FOREIGN PATENT DOCUMENTS

WO   2000/050872 A2   8/2000

OTHER PUBLICATIONS

Axelrod, 2001, Total internal reflection fluorescence microscopy in cell biology, Traffic, 2(2):764-774.

(Continued)

*Primary Examiner* — Natalia Levkovich
(74) *Attorney, Agent, or Firm* — Thomas C. Meyers; Sullivan & Worcester LLP

(57) ABSTRACT

The present invention includes multi-well plate readers, and methods of their use. The multi-well plate readers can transmit stimulation light to, and detect emission light from, individual wells of a multi-well plate, simultaneously.

18 Claims, 21 Drawing Sheets

(56) References Cited

U.S. PATENT DOCUMENTS

| | | |
|---|---|---|
| 7,316,801 B2 | 1/2008 | Kercso et al. |
| 7,531,303 B2 | 5/2009 | Dorsel et al. |
| 7,978,412 B2 | 7/2011 | Moriwaka |
| 8,908,277 B2 | 12/2014 | Pesach et al. |
| 9,664,613 B2 | 5/2017 | Wohlstadter et al. |
| 10,436,713 B2 | 10/2019 | Battrell et al. |
| 12,105,023 B2 | 10/2024 | Borja et al. |
| 2003/0179374 A1 | 9/2003 | Jaaskelainen |
| 2004/0110123 A1 | 6/2004 | Maher et al. |
| 2005/0112757 A1 | 5/2005 | Spence et al. |
| 2005/0176056 A1 | 8/2005 | Sammak et al. |
| 2012/0053084 A1 | 3/2012 | Gerber et al. |
| 2014/0295413 A1 | 10/2014 | Cohen et al. |
| 2014/0340482 A1 | 11/2014 | Kanarowski |
| 2015/0004637 A1 | 1/2015 | Cohen et al. |
| 2015/0080256 A1 | 3/2015 | Gambini et al. |
| 2015/0216398 A1 | 8/2015 | Yang et al. |
| 2017/0246635 A1 | 8/2017 | Buermann et al. |
| 2017/0248621 A1 | 8/2017 | Putnam et al. |
| 2017/0270690 A1 | 9/2017 | Chung et al. |
| 2017/0292961 A1 | 10/2017 | Cohen et al. |
| 2017/0315430 A1 | 11/2017 | Nang et al. |
| 2017/0370827 A1 | 12/2017 | Wohlstadter et al. |
| 2018/0136198 A1 | 5/2018 | Gerber et al. |
| 2018/0136446 A1 | 5/2018 | Werley et al. |
| 2019/0154652 A1 | 5/2019 | Ghosh et al. |
| 2019/0295413 A1 | 9/2019 | Hase et al. |
| 2020/0075426 A1 | 3/2020 | Schmid et al. |
| 2020/0158497 A1 | 5/2020 | Arnoult et al. |
| 2022/0203372 A1 | 6/2022 | Borja et al. |
| 2022/0205914 A1 | 6/2022 | Borja et al. |
| 2022/0205979 A1 | 6/2022 | Borja et al. |
| 2022/0206280 A1 | 6/2022 | Werley et al. |

OTHER PUBLICATIONS

Candia, 2017, Assessment of variability in the SOMAscan assay, Sci Rep 7(1):14248.

Fest, 2013, Baffle and Cold Shield Design, In: Stray Light Analysis and Control, Society of Photo-Optical Instrumentation Engineers (SPIE), pp. 163-182.

McGorty, 2015, Open-top selective plane illumination microscope for conventionally mounted specimens, Opt Exp 23(12):16142-16153.

Simon, 2009, Partial internal reflections on total internal reflection fluorescent microscopy, Trends Cell Bio 19(11):661-668.

Sluder, 2013, Fluroescent Protein Applications in Microscopy, from Digital Microscopy, Sluder & Wolf, Eds., Elsevier Science & Technology, p. 133.

Szymula et al.: "An Open-Source Plate Reader", Biochemistry, (2019), vol. 58, pp. 468-473.

* cited by examiner

OPTICAL PLATE CONTROLLER AND READER

FIELD OF THE INVENTION

The invention generally relates to a plate reader for use in biological assays.

BACKGROUND

Whole plate imaging has been used to assess the electrophysiology of cells in multiplex formats. However, existing plate imagers and their associated techniques suffer from inherent problems.

For example, automated electrophysiology has been used to assess the electrical activity of cells in a sample. Automated electrophysiology uses direct measurement of cells' ion channels and electrical activity using physical electrodes for stimulating and recording cells. However, using physical electrodes for stimulation and recording can open holes in cell membranes, which can lead to intracellular dialysis and damage the cells. This prevents automated electrophysiology from being used in certain complex experiments, which require the intact intracellular molecular machinery or re-use of cells. In addition, automated electrophysiology instruments typically require use of dissociated cells, which can damage neurons and other cell types and lead to loss of cellular compartments, and limit measurements of processes involved in cell-to-cell communication. Moreover, automated electrophysiology assays are expensive, largely due to the specialized assay plates required.

Fluorescent imaging kinetic plate reader (FLIPR) instruments can provide measurements of cellular voltage-gated, ligand-gated, and constitutive channel activity in cells using a multi-well plate format. For voltage gated sodium channel screening using FLIPR methods, cellular activity is generally activated using chemical stimulation of voltage-gated channels. However, the chemical stimuli used may not reflect physiological processes or be indicative of in vivo cellular activity, which can alter the pharmacological responses measured in the assays. That is especially problematic in assays used to screen for drug candidates. In addition, FLIPR-type instruments may lack the temporal resolution to record important ion channel functions and may lack sensitivity to enable use of genetically encoded sensors.

Electrical field stimulation (EFS) with fluorescent readout is a variation of FLIPR. In these methods and instruments, electrodes are incorporated into assay wells to stimulate electrically excitable cells. However, voltage control for this electrical stimulation is limited and nonuniformities in the field can lead to overstimulation or electroporation, which can negatively impact assay performance.

SUMMARY

The present invention provides multi-well plate readers that transmit stimulation light to, and detect emission light from, individual wells of a multi-well plate at a plurality of distinct wavelengths. The plate readers include a number of optical channels, each with an objective lens that focuses light to a separate well of a multi-well plate. This allows the plate readers to simultaneously transmit and detect light from individual wells across a multi-well plate.

Multi-well plate readers of the invention, and their corresponding methods, provide highly-parallelized readings, such as optogenetic recordings, across the wells of multi-well plates. The methods and readers of the invention can assay about 10,000-25,000 or more individual wells per day, representing at least a five-fold higher throughput than, for example, most automated electrophysiology assays and instruments. Moreover, because multi-well plate readers of the invention can transmit stimulation light and detect emission light at a plurality of wavelengths, they are useful with combinations of optical actuators and reporters of cellular activity. This provides plate readers of the present invention with the flexibility to perform diverse assays, including, for example, complex optogenetic assays and advanced cellular measurements.

A preferred plate reader of the invention includes a sample stage to support a multi-well plate and a plurality of optical channels. Each optical channel can include an objective lens capable of transmitting light at a plurality of different wavelengths and capable of detecting light at a plurality of different wavelengths. The light can be detected using a different light detector for each different wavelength. The sample stage may further include a plate pusher that displaces the multi-well plate with respect to the plurality of optical channels. The plate pusher can thus align each of a plurality of wells of the multi-well plate with one of the optical channels. This allows each optical channel to transmit light to and detect light from an aligned well.

In certain aspects, each of the plurality of optical channels simultaneously transmits light to and/or detects light from an aligned well. Further, each optical channel is capable of transmitting light of at least three distinct wavelengths to an aligned well. In certain aspects, each optical channel may be capable of transmitting light of four distinct wavelengths to an aligned well. Each optical channel may also be capable of detecting light of at least three distinct wavelengths from an aligned well. In certain aspects, each optical channel is capable of detecting light of three or more distinct wavelengths from an aligned well.

In certain aspects, each of the optical channels transmits light at one or more distinct wavelengths that lead to the stimulation of at least one optical reporter in an aligned well. The optical channels may detect emission light from the at least one optical reporter in the aligned well. The optical reporter may be a protein in cells in the aligned well. The optical reporter can include a fluorescent reporter of membrane electrical potential, intracellular ion concentration, or concentration of intracellular metabolites or signaling molecules.

In certain aspects, the cells are neurons, muscle cells, HEK cells, or cardiomyocytes, endocrine cells and engineered cells. However, any cells may be used. Cells may include optical actuators of electrical activity. The optical actuators of electrical activity may include one or more light-gated ion channels. In certain aspects, the light-gated ion channels include one or more algal channelrhodopsins.

In certain aspects, at least one optical reporter is a fluorescently labeled nucleotide analogue. In certain aspects, each optical channel is capable of transmitting light of three or more distinct wavelengths to an aligned well, and each distinct wavelength stimulates a different one of the nucleotide analogues. Each optical channel may be capable of detecting light of three or more distinct wavelengths from an aligned well, and each distinct wavelength is an emission from one of the nucleotide analogues. Different wavelengths of light detected by an optical channel as it passes through the objective and along a different optical path. Additional aspects and advantages of the invention shall be apparent to the skilled artisan upon consideration of the following detailed description thereof.

DETAILED DESCRIPTION

Figure 1:
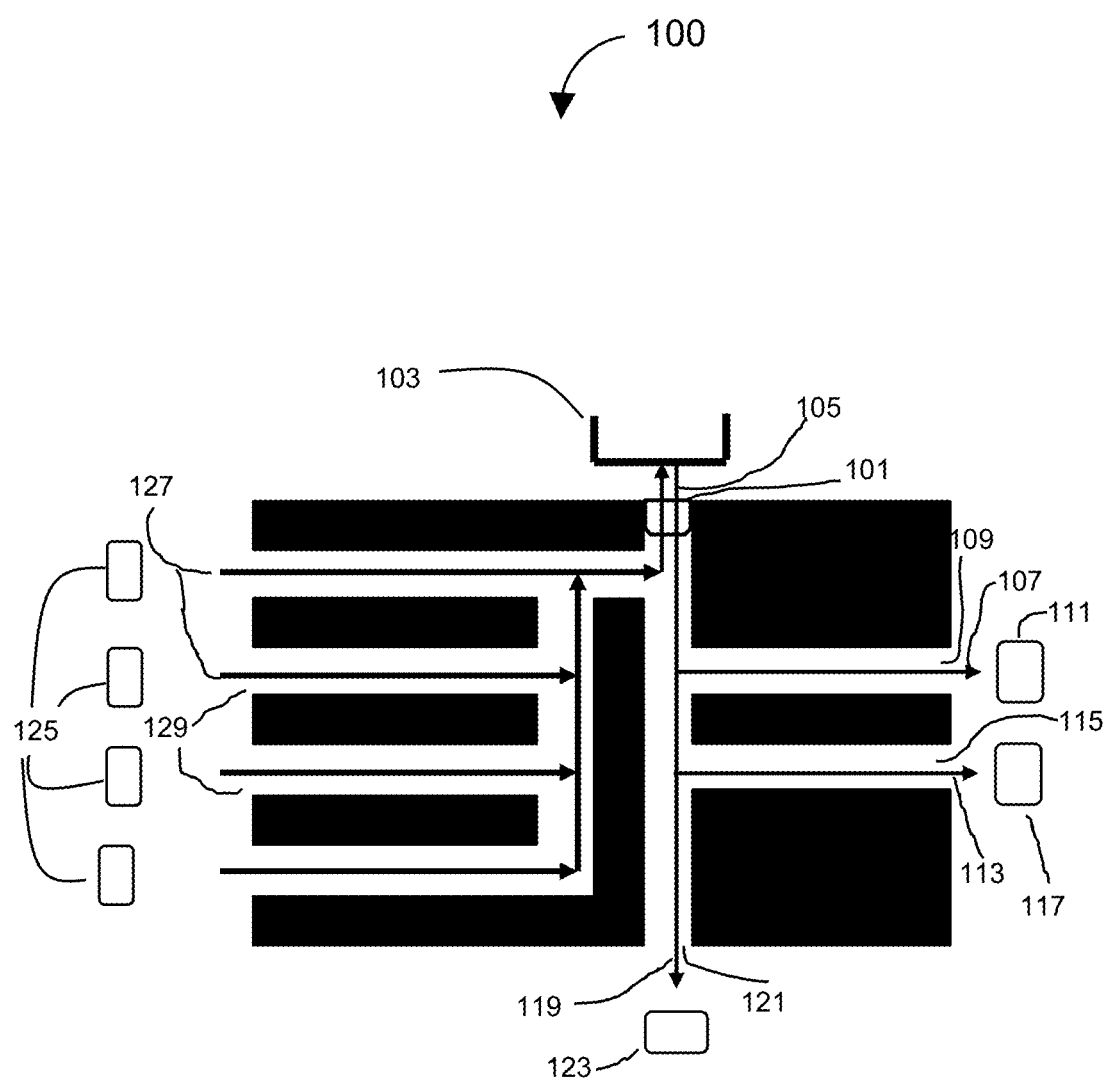
FIG. 1 shows a schematic of an optical channel.

The present invention provides multi-well plate readers that transmit stimulation light to, and detect emission light from, individual wells of a multi-well plate at a plurality of distinct wavelengths. The plate readers include a number of optical channels, each with an objective that can be aligned with a separate well of a multi-well plate. These multi-well plate readers, and their corresponding methods, can provide highly-parallelized, simultaneous measurements across a plurality of wells of a multi-well plate, such as 48-, 96-, 384-, or 1536-well plates.

The devices and methods of the present invention can be used in conjunction with optogenetics. In optogenetics, light is used to control and observe certain events within living cells. For example, a light-responsive gene such as a fluorescent voltage indicator can be introduced into a cell. The reporter may be, for example, a transmembrane protein that generates an optical signal in response to changes in membrane potential, thereby functioning as an optical reporter. When excited with a stimulation light at a certain wavelength, the reporter is energized to and produces an emission light of a different wavelength, which indicates a change in membrane potential. Cells in the sample may also include optogenetic actuators, such as a light-gated ion channels. Such channels respond to a stimulation light of a particular wavelength, initiating an action potential or a regenerative signal in a cell.

The multi-well plate readers of the present invention can be used with additional reporters of cellular activity, and the associated systems for actuating them. For example, proteins that report changes in intracellular calcium, intracellular metabolite or second messenger levels.

A challenge in combining multiple optical modalities (e.g. optical excitation, activation, voltage imaging, calcium imaging) is to avoid optical crosstalk between the modalities. For example, the pulses of light used to deliver optical activation should not induce fluorescence of the reporters; the light used to energize the reporters should not activate the light-gated ion channel; and the fluorescence of one reporter should be readily distinguished from the fluorescence of other reporters. The ability of the presently disclosed plate readers to accurately detect and transmit light of different wavelengths permits the use of these modalities within a single assay.

The plate readers of the invention are useful to observe fluorescent reporters that are sensitive to specific physical properties of their environment, such as biological signals. Biological signals may include, for example, action potentials, synaptic signals, ion concentration (e.g., calcium and sodium) or membrane potentials. The time-varying signals produced by these indicators is repeatedly measured to chart the course of chemical or electronic states of a living cell.

As the plate readers of the present invention allow simultaneous transmission of stimulating light and detection of emission light of different wavelengths, the plate readers can perform complex assays involving numerous optically actuated and/or detectable proteins.

Thus, samples used in the plate readers of the present invention include cells expressing an optical actuator of electrical activity and an optical reporter of electrical activity or ion concentration. The sample may be configured such that a first cell expresses the actuator and a second cell expresses the reporter. The plate reader can activate the light-sensitive actuator protein with a stimulating light beam to cause a change in the protein, thereby initiating a change in membrane potential in the cell. The result is that the cell "fires," i.e., an action potential or regenerative signal propagates in the electrically-active cell. The plate reader can simultaneously transmit a stimulating light beam to a fluorescent optical reporter protein with a beam that is spectrally distinct from that used to stimulate the optical reporter. The plate reader can measure the fluorescence emitted by the reporter to measure corresponding changes in membrane potential or ion concentration.

One example of environmentally sensitive fluorescent reporters for use with the present invention are rhodopsin-type transmembrane proteins that generate an optical signal in response to changes in membrane potential, thereby functioning as optical reporters of membrane potential. Archaerhodopsin-based protein QuasAr2 and QuasAr3, are excited by red light and produce a signal that varies in intensity as a function of cellular membrane potential. These proteins can be introduced into cells using genetic engineering techniques such as transfection or electroporation, facilitating optical measurements of membrane potential. The plate readers of the invention can stimulate QuasAr2 or QuasAr3 in a sample using light having a wavelength of between 580 and 650 nm. The light may have an intensity between 10 and 400 W/cm$^2$.

In addition to fluorescent indicators, the plate readers of the present invention can be used to optically stimulate light-sensitive compounds for chemically or electrically perturbing cells. The invention can be used with voltage-indicating proteins such as those disclosed in U.S. Patent Publication 2014/0295413, filed Jun. 12, 2014, the entire contents of which are incorporated herein by reference. For example, an optical actuator of cellular activity may be a genetically-encoded rhodopsin or modified rhodopsin such as a microbial channelrhodopsin. For example, sdChR, a channelrhodopsin from Scherffelia dubia, may be used or an improved version of sdChR—dubbed CheRiff—may be used as an optical actuator. "CheRiff" refers to a version of sdChR that uses mouse codon optimization, a trafficking sequence, and the mutation E154A as described herein.

The plate readers may be used with additional reporters and associated systems for actuating them. For example, proteins that report changes in intracellular calcium levels may be used, such as a genetically-encoded calcium indicator (GECI). The plate reader may provide stimulation light for a GECI, such as yellow light for RCaMP. Exemplary GECIs include GCaMP or RCaMP variants such for example, jRCaMP1a, jRGECO1a, or RCaMP2. In one embodiment, the actuator is activated by blue light, a Ca2+ reporter is excited by yellow light and emits orange light, and a voltage reporter is excited by red light and emits near infrared light.

In certain aspects, the plate readers of the invention can perform assays using optically modulated actuators that are combined with fluorescent reporters to enable all-optical characterization of specific cell traits, such as excitability. For example, the Optopatch method combines an electrical actuator protein such as CheRiff with a fluorescent reporter such as QuasAr2. The actuator and reporter proteins respond to different wavelengths of light, allowing membrane potential to be measured at the same time cells are excited over a range of photocurrent magnitudes.

Measuring the electrical properties or activities of cells is useful for the study, diagnosis, and cure of diseases that involve electrically active cells, such as heart and brain cells (e.g., neurons and cardiomyocytes). Conditions that affect these cells include heart disease, atrial fibrillation, amyotrophic lateral sclerosis, primary lateral sclerosis, pain, neural disorders, and many others. All-optical measurements provide an attractive alternative to conventional methods like patch clamping because they do not require precise micromechanical manipulations or direct contact with cells in the sample. Optical methods, especially when used with the plate readers of the present invention, are more amenable to high-throughput applications. The dramatic increases in throughput afforded by all-optical measurements have the potential to revolutionize study, diagnosis, and treatment of these conditions.

Thus, the present invention provides methods using the disclosed plate readers that include exciting cells in specific wells of a multi-well plate that are to be observed or stimulating a cell to initiate an action potential or regenerative signal. Stimulation may be direct or indirect (e.g., optical stimulation of an optical actuator or stimulating an upstream cell in gap junction- or synaptic communication with the cell(s) to be observed). Stimulation may be optical, electrical, chemical, or by any other suitable method. Stimulation may involve any pattern of activation including, for example, regular, periodic pulses, single pulses, irregular patterns, or any suitable pattern. Methods may include varying optical stimulation patterns in space or time to highlight particular aspects of cellular function. For example, a pulse pattern may have an increasing frequency. In certain embodiments, the methods may include stimulating an electrically active cell that expresses an optical activator using pulses of light.

For example, the plate readers of the present invention can be used to characterize the physical properties of cells using fluorescent reporters and light-sensitive actuators of cellular activity. Such assays can be designed, for example, to study the effect of a potential drug compound on cells. For example, the plate readers can be used to optically obtain an action potential (AP) and calcium transient (CT) waveform from a stem-cell derived cardiomyocyte to characterize an arrhythmia in the cardiomyocyte. Cardiomyocytes in the sample located in a well of a multi-well plate can be caused to express a rhodopsin-type transmembrane optical reporter. The plate reader can activate a microbial channelrhodopsin with stimulating light, causing an AP to propagate through the cardiomyocytes. Cells containing a reporter protein are illuminated via stimulation light from the plate reader, and the AP causes a change in the fluorescence of the reporter. Light from the reporter is detected by the plate reader and analyzed to construct the AP waveform. An arrhythmia in the constructed AP waveform can be detected or characterized, e.g., by comparison to a known standard or other analytical techniques.

The plate readers of the invention can thus be used to study a compound's effect on cells. Since the plate reader can analyze a sample found in wells of a multi-well plate, cells of the sample can be observed while in a supporting cell medium. This allows the activity of cells to be analyzed both before and after introduction of a compound of interest, such as a potential drug, to the sample. The plate reader can thus detect a resulting perturbation to the detected AP waveform and other characteristics associated with exposure to a compound. Since the optical reporter can include a voltage reporter, an ion reporter (e.g., for [Ca2+]), others, or combinations thereof, the plate reader can detect the effect of the compound across multiple ion channels of cells as revealed through all features of the AP waveform.

Moreover, because the plate readers of the invention can analyze living cells in wells of a multi-well plate, the cells can be exposed to media that includes compounds, such as mediators, that are used to mimic a particular in vivo condition. For example, mediators may be selected to mimic the local environment of a tissue associated with a specific type of pain signal, a tumor, or other disease or condition. The cells in these model conditions may be used to discover or develop therapeutic agents associated with a modeled disease or condition.

For example, samples analyzed by the plate readers of the invention may include cells from in vitro pain models. In these models, compositions of selected pain mediators are introduced to cultured neurons, which then exhibit greatly increased rapidity of firing and hypersensitization. Sensory neurons such as dorsal root ganglion neurons are known to send pain signals to the brain. Sensory neurons, such as dorsal root ganglion neurons, may be exposed to pain mediator compositions in a well of a multi-well plate to create model neuronal signals that would be experienced by the brain as pain. Test compounds can be introduced into the model to screen for compounds that return neuronal signals to a baseline state in the presence of the pain mediator composition.

In certain aspects, the plate readers can be used in methods for assaying biological activity using a sample comprising cells having optical reporters of cellular activity, which includes a normalization step.

In an exemplary method, cells in one or more wells of a multi-well plate are stimulated with a reference stimulus that causes a particular cellular activity. The reference stimulus may be a stimulating light transmitted to the sample from the plate reader, e.g., blue light. This reference stimulus may be a saturating stimulus and may be transmitted to all wells of a multi-well plate. One or more wells containing a sample are then exposed to test conditions that model a biological or chemical stimulus of cellular activity. This may include, for example, providing a stimulating wavelength of light to an optical actuator of cellular activity. The plate reader then detects an optical test signal from optical reporters in the cells of the sample caused by the test conditions. The test signal is then normalized to the reference signal to predict the level of activity of the cells in response to the modeled biological/chemical stimulus.

FIG. 1 provides a general schematic of an exemplary independent optical channel 100 of an optical-channel module used in a multi-well plate reader of the invention. The optical-channel 100 includes an objective lens 101, that aligns with a well 103 of a multi-well plate. Emission light 105 of different wavelengths, such as that from fluorescent reporters, passes along different optical paths to corresponding light detectors. In the exemplary optical-channel module 100, emission light of a first wavelength 107 is passed along a first optical path 109 to a first light detector 111. Emission light of a second wavelength 113 is passed along a second optical path 115 to a second light detector 117. Emission light of a third wavelength 119 is passed along a third optical path 121 to a third light detector 123.

The optical-channel 100 also includes light sources 125 that transmit stimulation light at different wavelengths 127, each wavelength along a different optical path 129 through the objective lens 101 to the well 103, which contains a sample. The light sources 125 can independently include an LED, a diode laser bar, a laser, a diode laser, or any other suitable light source. Each light source (125) may be configured to transmit stimulation light that is both spectrally distinct from the stimulation light of each other light source (125) and from emission light from the sample. One or more of the optical paths (129) along which the stimulation light (127) travels may include one or more dichroic mirrors to reflect the stimulation light through the optical paths and upwards onto the sample. The dichroic mirrors may be configured to allow the emission light (107, 113, 119) from the sample to pass downward through the mirrors and along the emission light optical paths (109, 115, 121) to the detectors (111, 117, 123).

In certain aspects, one or more of the light sources (125) transmits light at a wavelength capable of exciting a light-sensitive actuator protein. The light-sensitive actuator protein may be, for example, a light-gated ion channel, such as CheRiff, and the wavelength of the activation light can be, for example, between 450 and 495 nm. The activation light may have an intensity of about 22 mW/cm$^2$. In certain aspects, one or more of the light sources (125) transmits light at a wavelength capable of exciting a microbial rhodopsin, such as QuasAr2 or QuasAr3. The wavelength of the illumination light may be, for example, between 580 and 650 nm. The illumination light may have an intensity between 10 and 400 W/cm$^2$ and preferably about 100 W/cm$^2$. Concurrently or alternatively, one or more of the light sources may, for example, provide stimulation light with a wavelength capable of exciting a light-sensitive reporter protein such as a light-sensitive calcium-indicating protein.

In some embodiments, the illumination light source is a diode laser bar, a diode laser, another type of laser, or an LED. The illumination light delivery may include fiber optics. The illumination subsystem may include baffles positioned to prevent unwanted reflected or refracted illumination light from entering the objecting lens. The illumination subsystem may also have other beam shaping optics disposed within a path defined by the illumination light.

Figure 2:
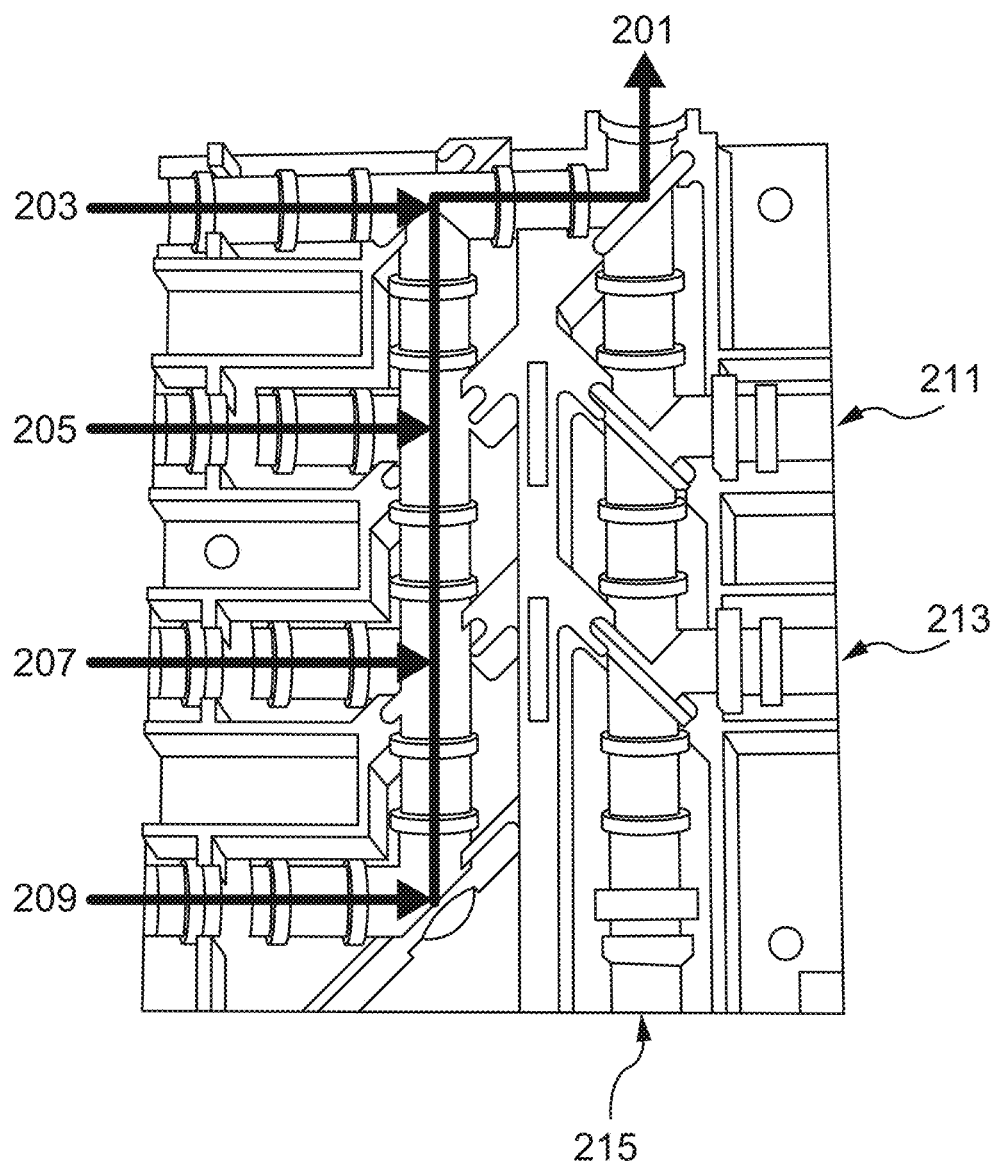
FIG. 2 shows an exemplary optical channel.

FIG. 2 provides a photograph of an exemplary optical channel 200. Emission light of different wavelengths is transmitted along the different optical paths (203, 205, 207, 209) through the objective lens 201. The emission light optical paths (211, 213, 215) are also shown.

Figure 3:
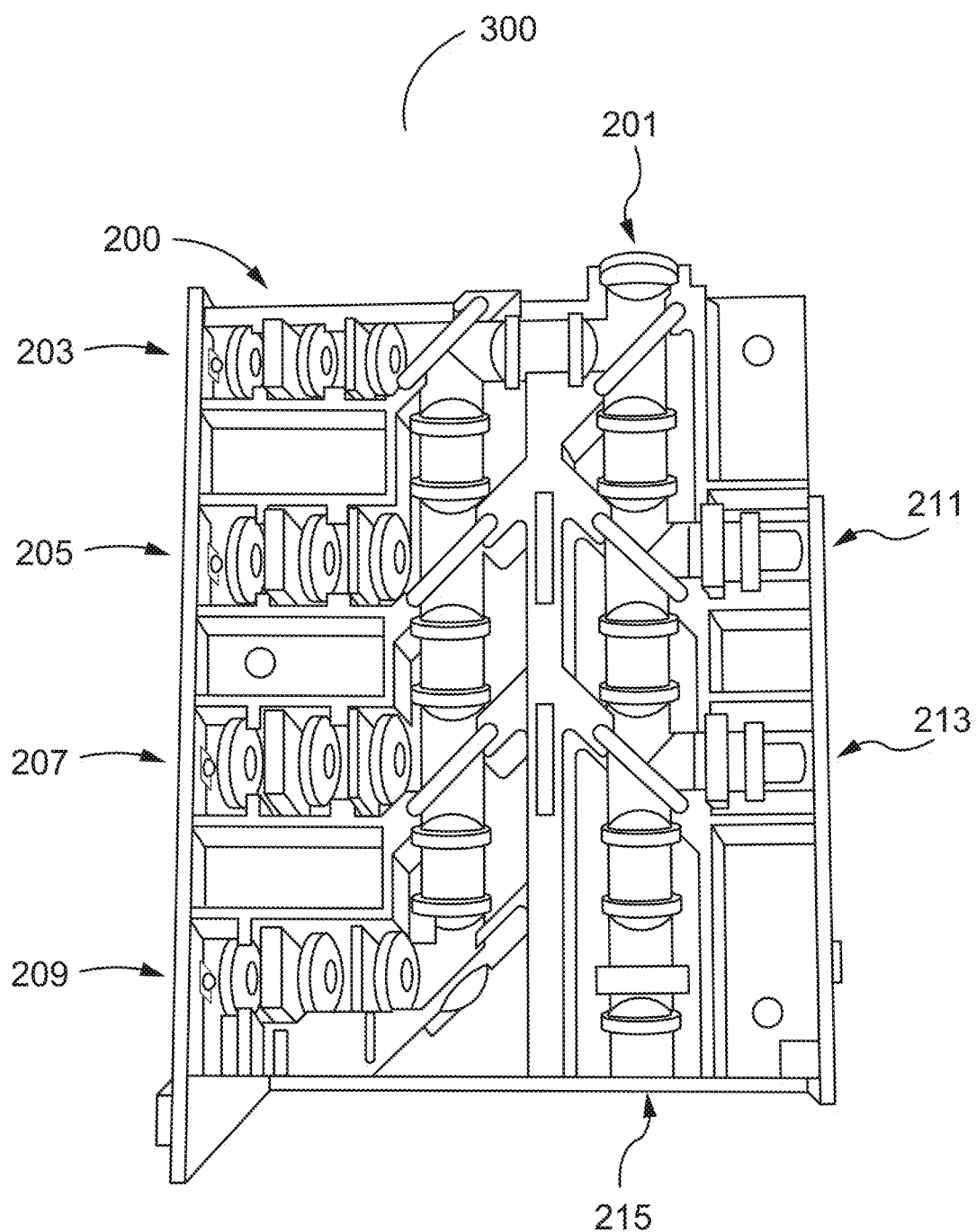
FIG. 3 shows an exemplary optical channel.

FIG. 3 provides a photograph of a cross-section 300 of the exemplary optical-channel 200. As shown, the optical channel 200 and its optical paths (203, 205, 207, 209, 211, 213, 215) include a series of dichroic mirrors, thin film filters, and molded aspheric lenses.

Figure 4:
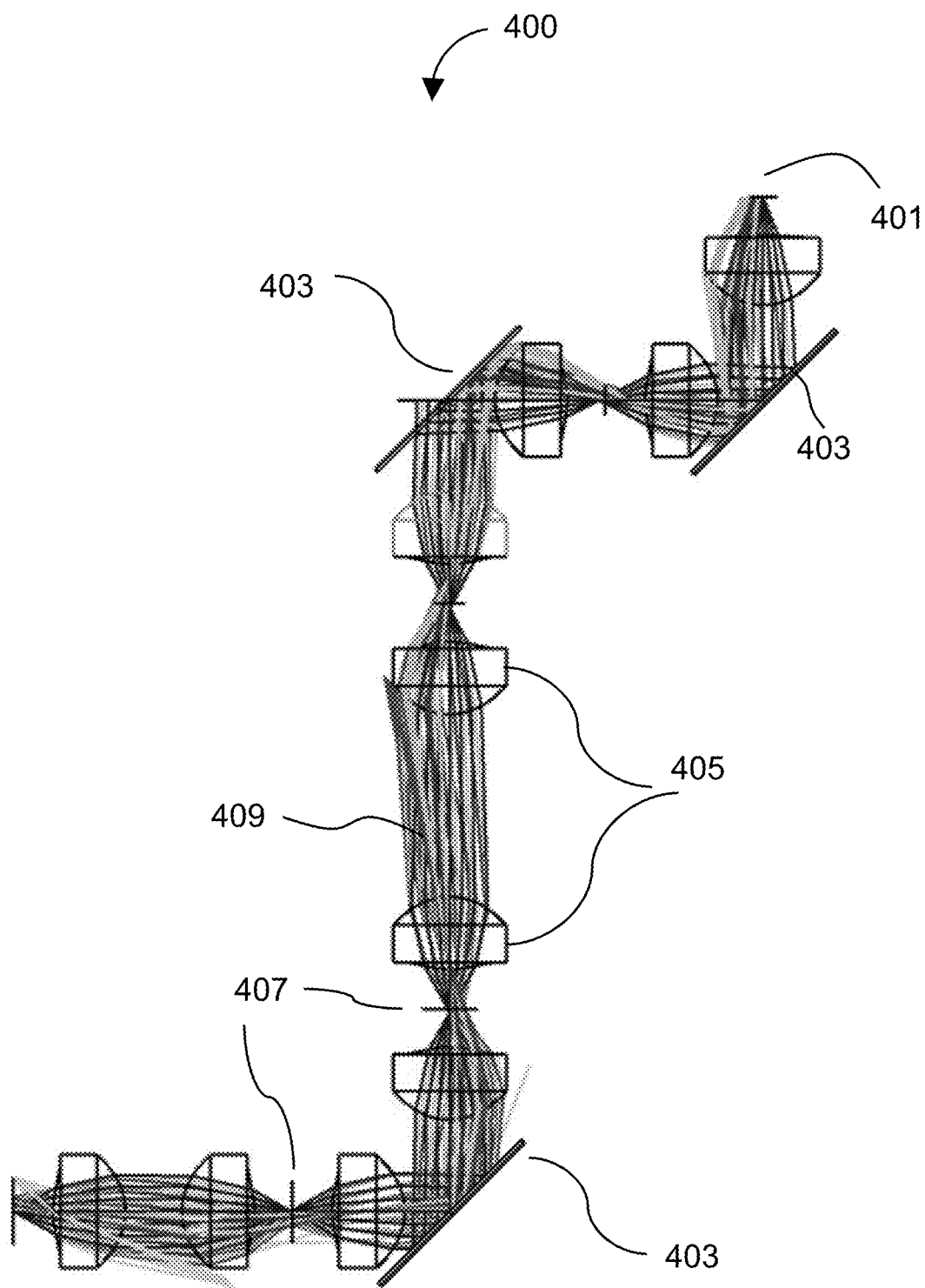
FIG. 4 shows an exemplary light path of an optical channel.

FIG. 4 provides a schematic 400 of an exemplary optical path of an optical-channel module of the invention. Emission/stimulation light 409 light is passed through a series of dichroic mirrors 403, thin film filters, patterned mask 407, and aspheric lenses 405, and through the objective lens 401. The present Inventors have discovered that, when used to detect emission light, this arrangement is surprisingly efficient.

In certain aspects, the multi-well plate reader of the invention includes a plurality of independent optical-channel modules.

Figure 5:
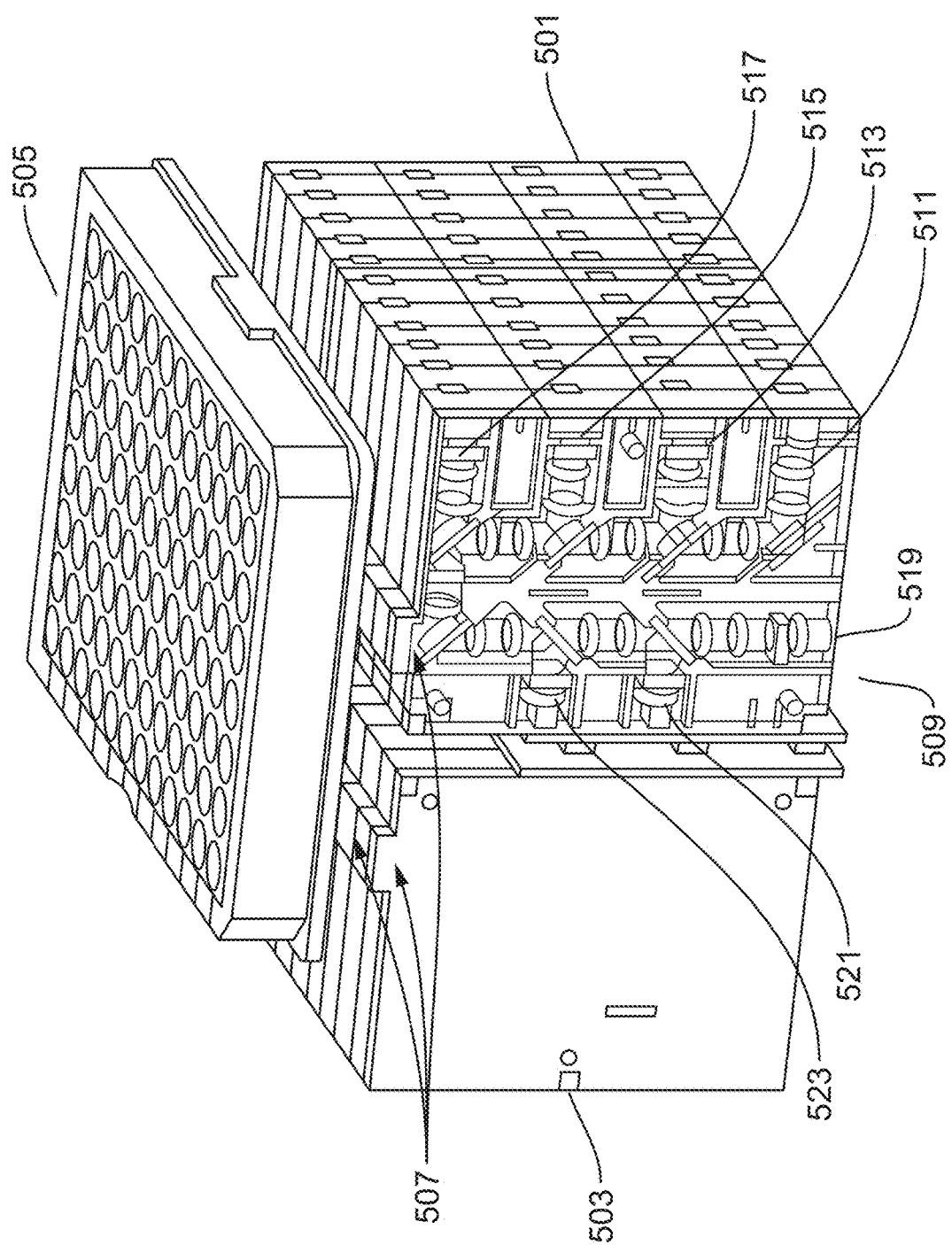
FIG. 5 shows exemplary read heads and a multi-well plate.

FIG. 5. shows a portion 500 of an exemplary multi-well plate reader. The plate reader includes two read heads (501, 503), each including six independent optical channel modules, and disposed underneath a multi-well plate 505. Each independent optical channel module includes two independent optical channels. The objective lens 507 of each independent optical channel is aligned with a different well of the multi-well plate 505. One of the optical channels 509 is illustrated as a cross-section to show the stimulation light optical paths (511, 513, 515, 517) and the emission light optical paths (519, 521, 523).

Figure 6:
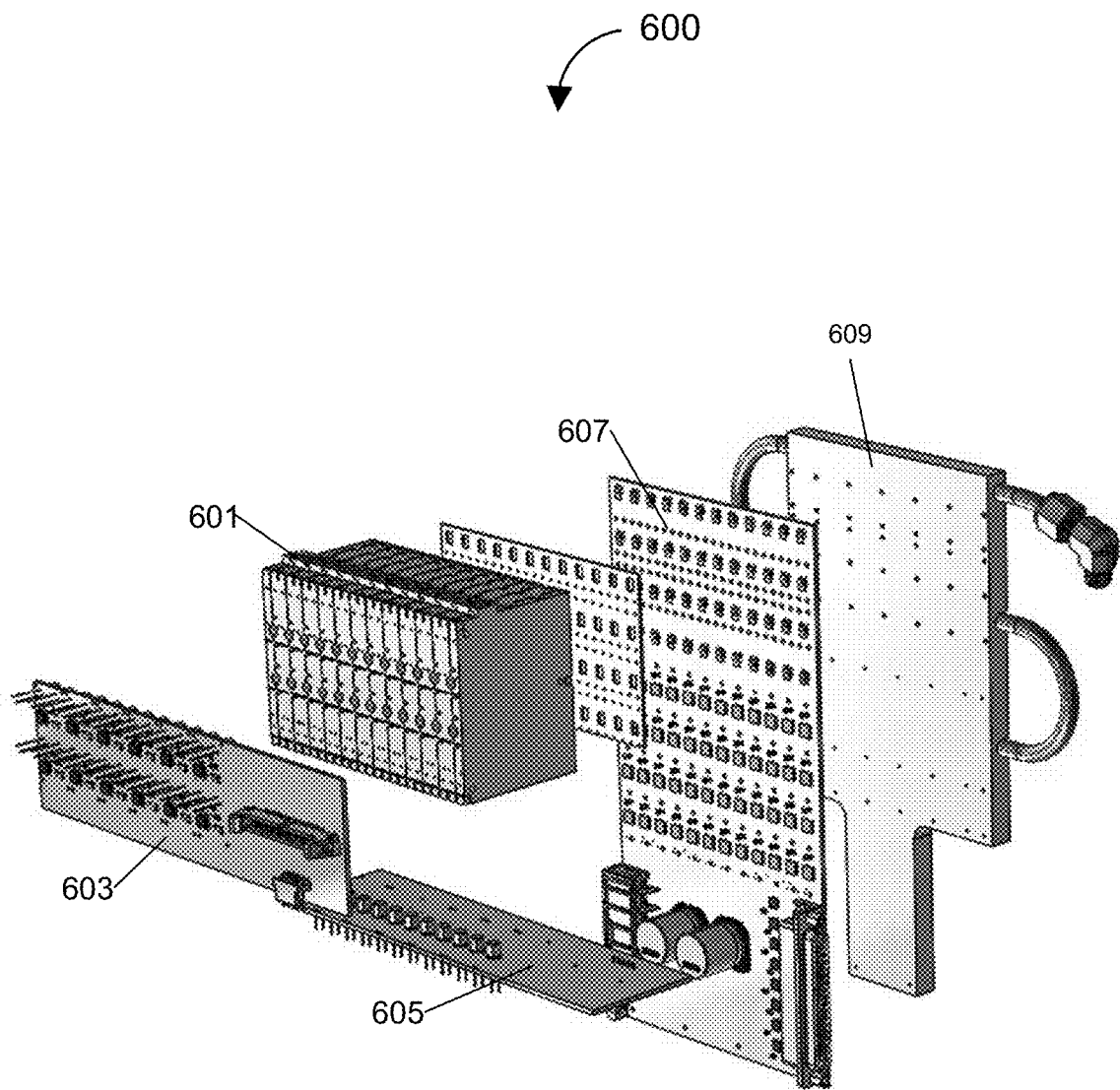
FIG. 6 shows an exploded view of an exemplary read head.

FIG. 6 shows an exploded view of an exemplary read head 600 of a multi-well plate reader of the invention. The read head includes six independent optical channel modules 601. Each optical channel module includes two independent optical channels and their respective objective lenses. Each optical channel module is attached to two printed circuit boards (PCB) (603, 605), which include photodiodes and independent picoammeter circuits. In the exemplary read head 600, the PCBs 603 (with 24 photodiodes; 12 per channel) and 605 (with 12 photodiodes) and associated six picoammeter circuits, with one of each devoted to a specific optical channel of an optical channel module. One photodiode and one picoammeter circuit are devoted to detecting an optical signal from emission light of an individual wavelength. The exemplary read head 600 also includes a PCB 607 for each optical channel module that includes 8 high-powered LEDs, four dedicated to providing stimulation light of a different wavelengths and pattern illumination for each individual optical channel. The read head also includes a heat exchanger 609 to cool the LED PCBs.

Figure 7:
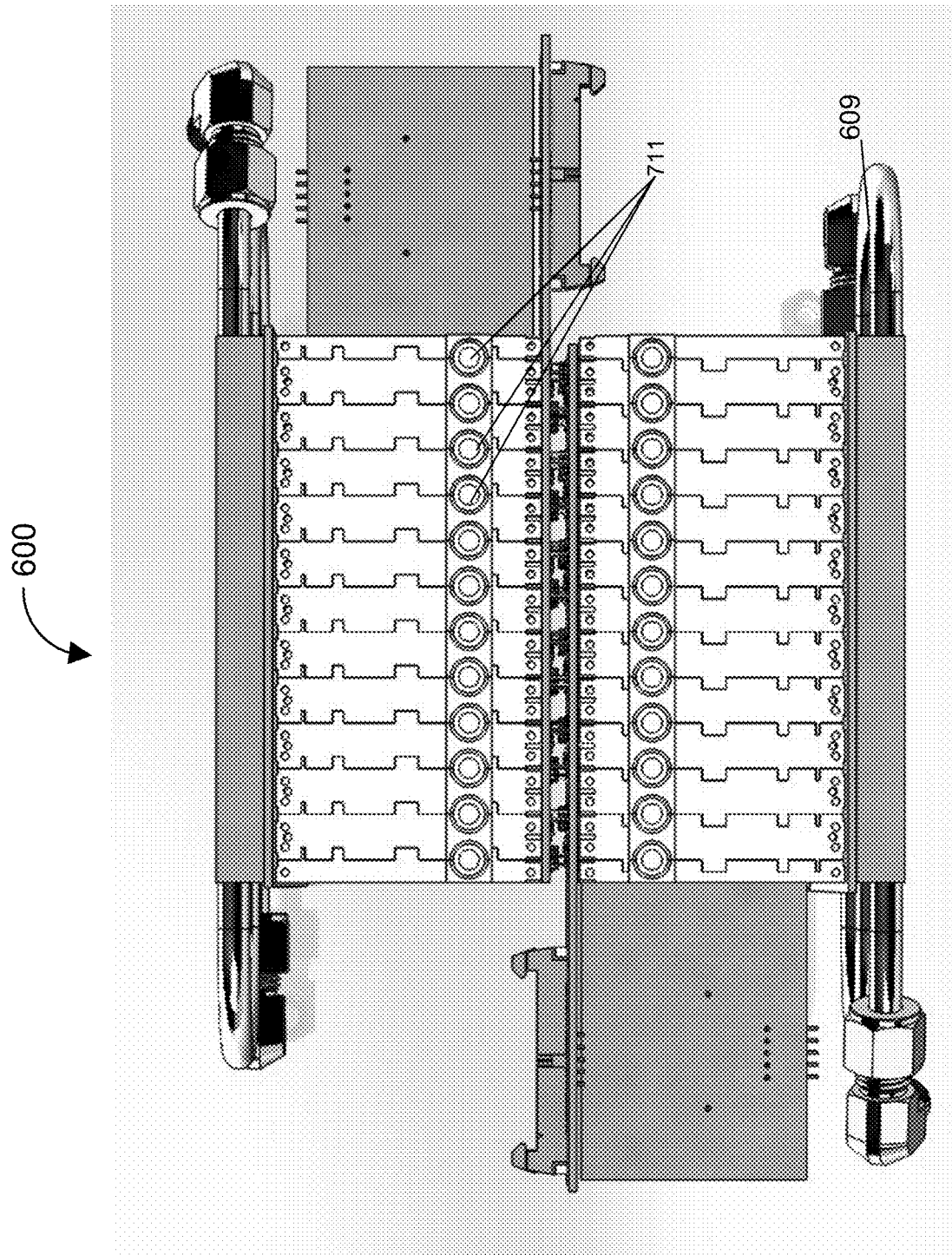
FIG. 7 shows an exemplary read head.

FIG. 7 provides a photograph of the exemplary read head 600 from an alternative view. In this view, the objective lens 711 of each optical channel are readily apparent.

Figure 8A:
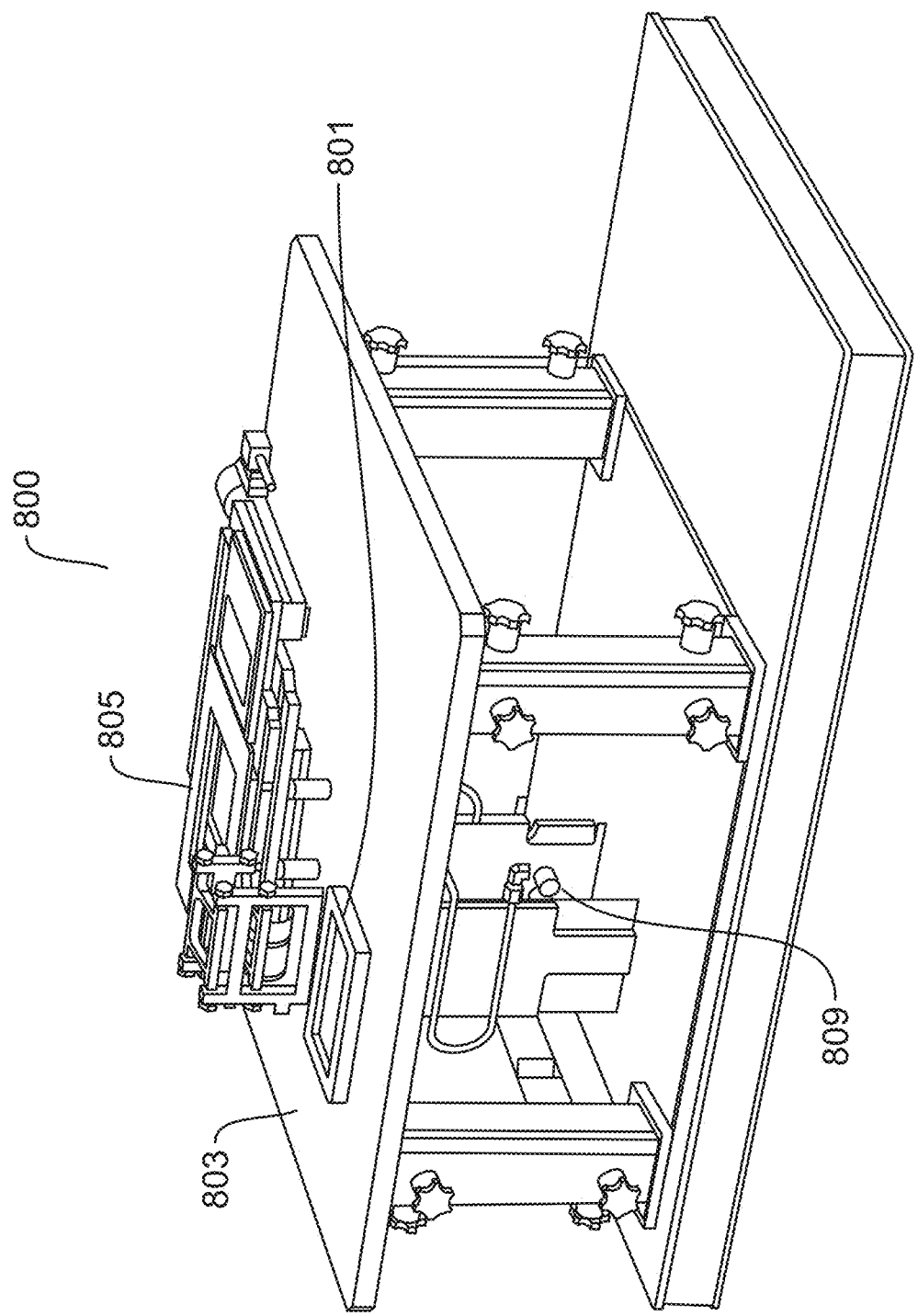
FIG. 8A shows an exemplary plate reader.

FIG. 8A provides a schematic of an exemplary plate reader 800 of the invention. A multi-well plate 801 is disposed on a reading platform 803 of the plate reader 800. The plate reader also includes a translational stage 805, which translates the multi-well plate 801 along multiple directions to align the wells of the multi-well plate 801, such that they align with the objective lenses of the optical channels. The plate reader 800 also includes motor controllers which control motors of the translational stage 805 in order to align the wells.

The plate reader 800 also includes LEDs and driver circuitry, with signals from the photodiode boards being connected to a connector board. Each connector board is connected to a power distribution bus and a data acquisition system (DAQ), such as a CompactDAQ™ from National Instruments Corp. (Austin, TX). The DAQ may provide synchronized analog output control and analog input sampling across the optical channels, and thus the wells of the multi-well plate 801. The DAQ may be connected by, for example, a USB connection to a workstation running control and/or data acquisition software.

Figure 8B:
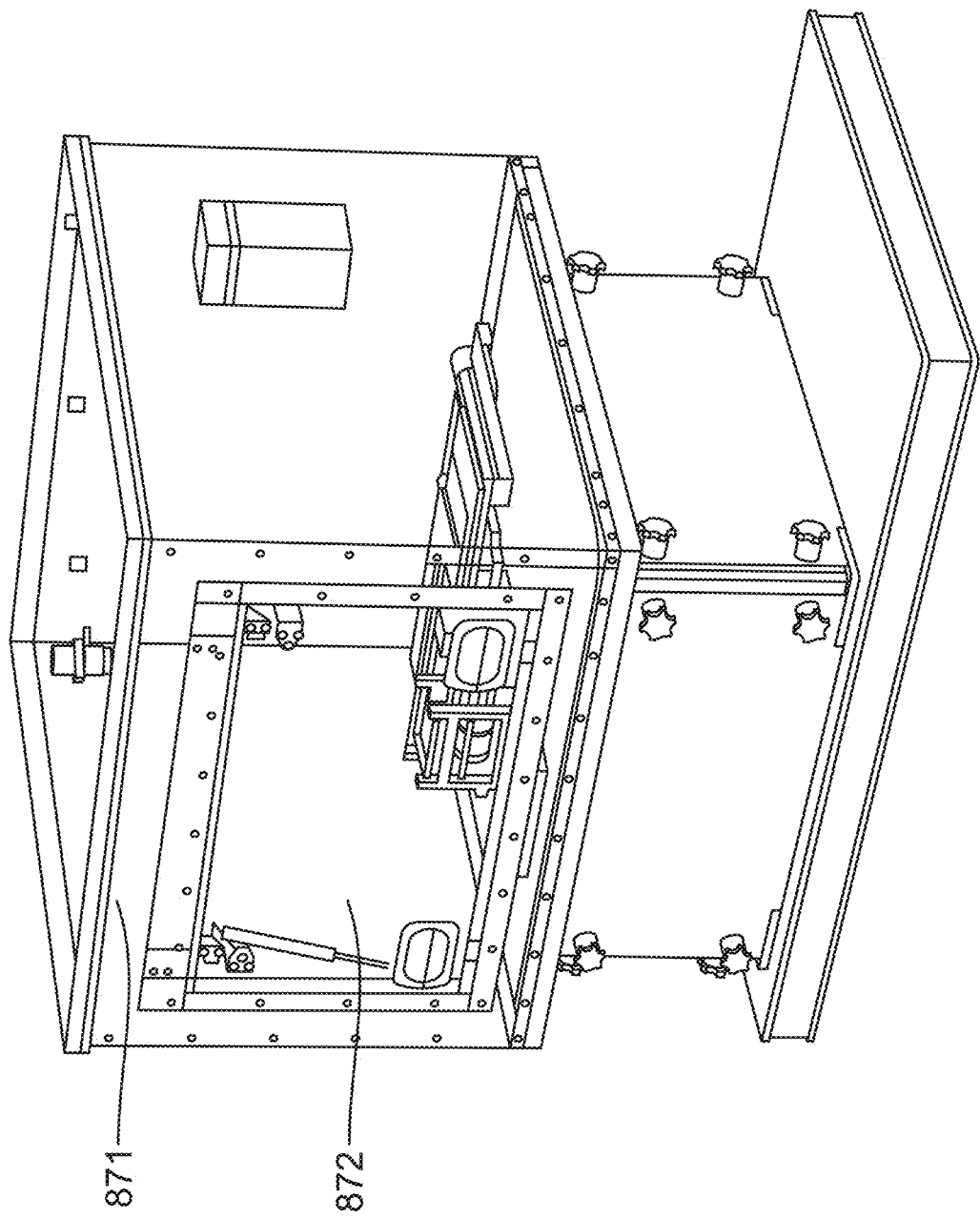
FIG. 8B shows the exemplary plate reader of FIG. 8A with a case.

As shown in FIG. 8B, the plate reader may include a case 871 that blocks external light and airborne contaminants from the plate reading platform. In certain aspects, the case 871 may be removable. In certain aspects, the case includes a door or hatch 872 to provide access to the plate reading platform.

Figure 9:
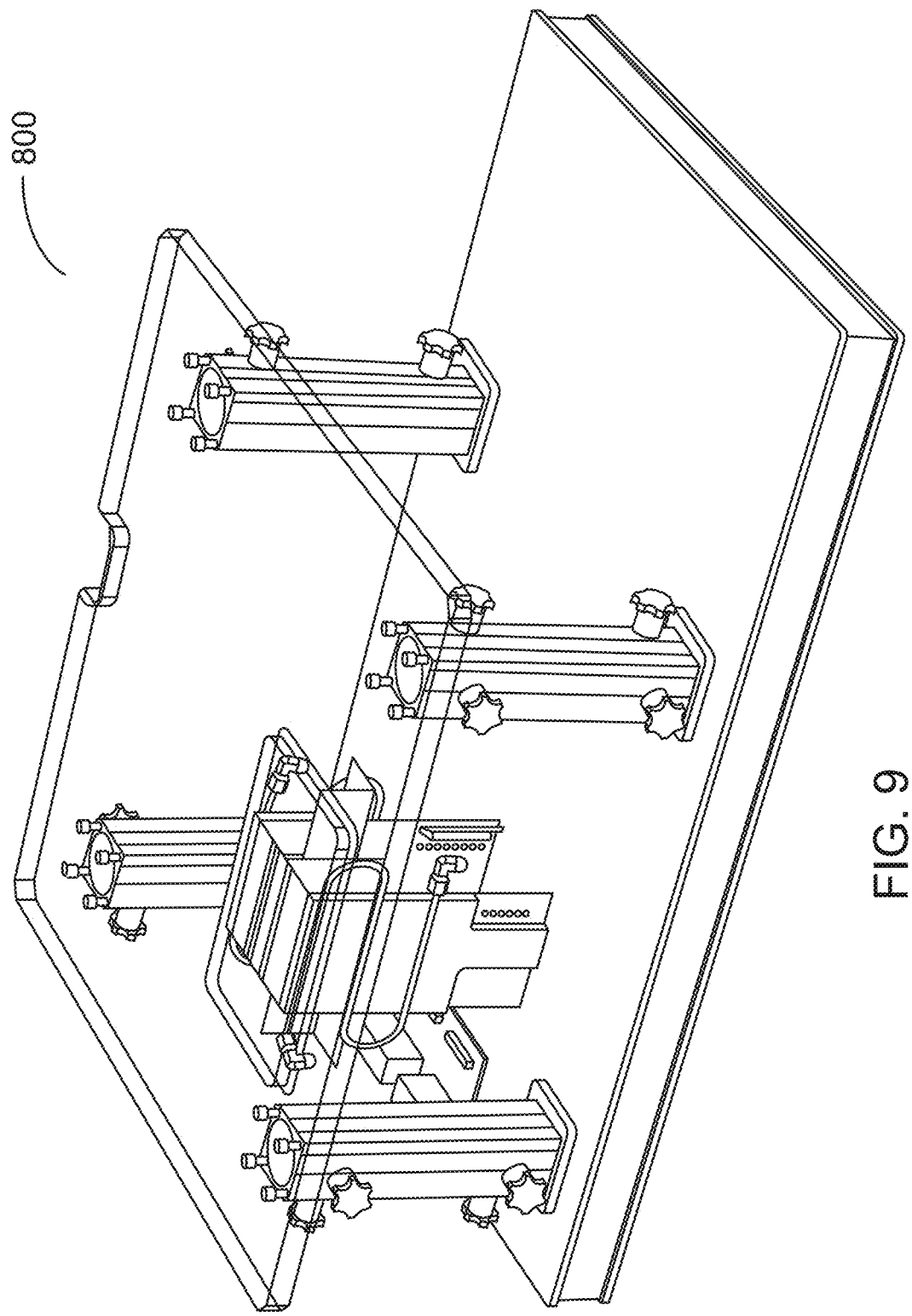
FIG. 9 shows an exemplary plate reader.

FIG. 9 provides a closeup view of exemplary plate reader 800. In this view, two read heads can be seen, including the PCBs with picoammeter circuits/photodiodes.

In certain aspects, the plate readers of the invention may include an environmental control subsystem operable to control environmental conditions associated with a sample in a multi-well plate positioned on the reader. The environmental control subsystem can control, for example, humidity, temperature, and other factors of the sample region. The environmental control subsystem can assure that the conditions in an aqueous medium in which cellular samples are contained within the well of a multi-well plate are maintained to keep the cells alive. This is especially important in optogenetic assays that assess the activity of cells in response to a stimulus.

In certain aspects, the plate readers of the present invention may include a microfluidic assembly to deliver fluids to wells in said multi-well plate. The assembly may, for example, deliver nutrients, such a cell medium, to keep the cells alive. The assembly can also, for example, deliver reagents, such as a compound of interest, to a sample in the wells of a multi-well plate. The plate reader may also contain a facility for loading a batch of plates within the instrument for sequential reading.

In certain aspects, the light channels are part of a light subsystem. The objectives and/or light subsystems of the plate readers may be coupled to a processing system. The processing system may be operable to model activity of a cell in a well using emission light from the well. Further, in certain aspects, the light detectors of the optical channels may digitize the optical signals into digital signals. The processing system may analyze and/or store the digitized signals. The processing system may also, for example, model activity-related waveforms from the digitized signals.

Figure 10:
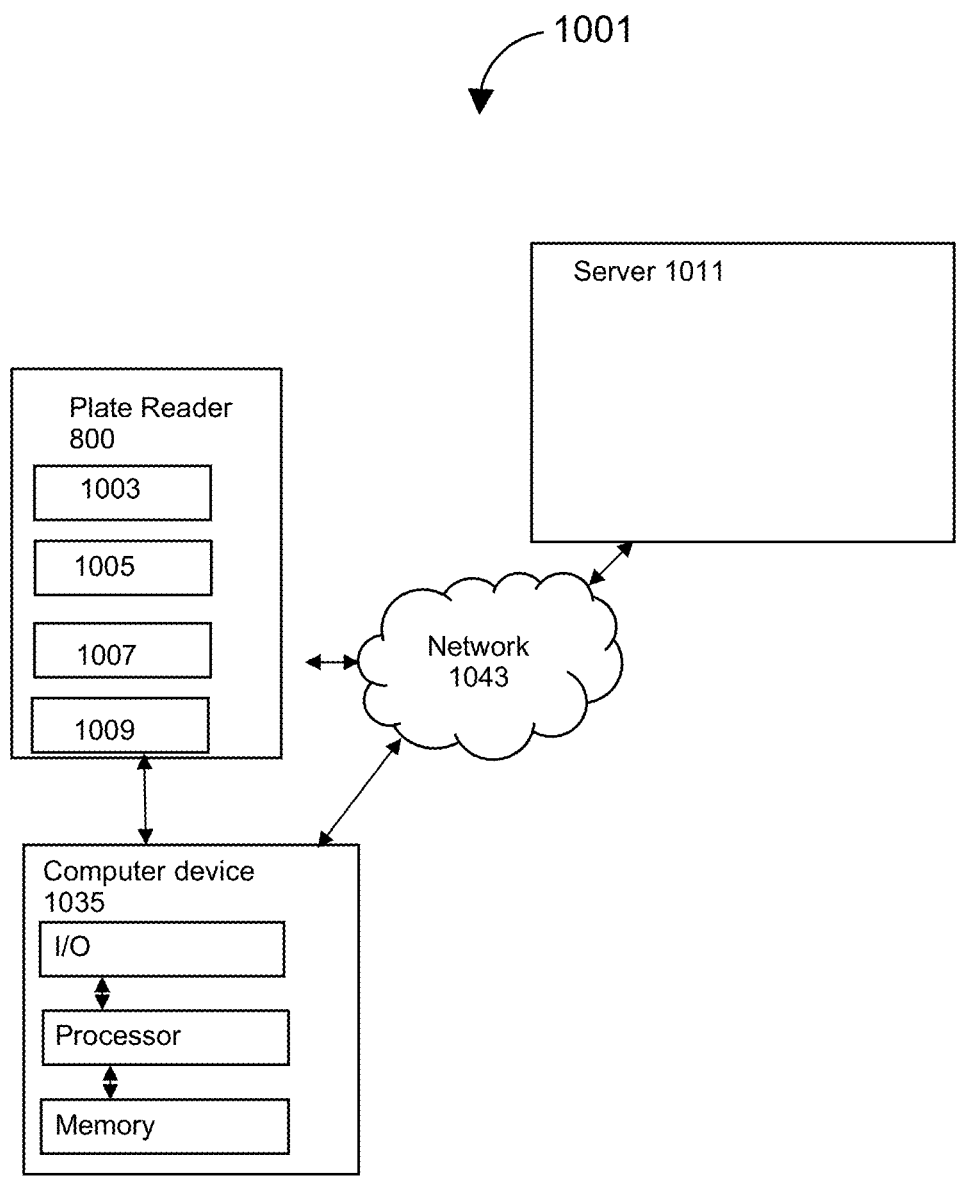
FIG. 10 shows a system of the invention.

FIG. 10 shows a schematic of a system 1001 for control and use of a plate reader 800 of the invention. The plate reader 800 includes optical system 1003, which includes the optical channels and their objectives. The plate reader 800 is connected directly or via network 1043 to computer device 1035. Optionally, system 1001 may include or access a server computer 1011. The computer device 1035 includes may include an input/output, such as a touchscreen configured to display results from an assay and to control, for example, the emission light, plate pusher 1005, environmental control subsystem 1007, and microfluidic assembly 1009, via user input. Using system 1001, a user may activate an electrically active cell displayed on the touchscreen.

The system 1001 includes a computer device 1035 connected to the plate reader 800, which will typically include a processor coupled to memory and one or more input/output device. Suitable I/O devices include monitor, keyboard, mouse, pointer, trackpad, touchscreen, camera, Wi-Fi card, network interface card, USB port, others, and combinations thereof. In certain embodiments, computer 1035 includes a touchscreen. The touchscreen may be configured to display a real-time image captured by the objective lens. The touchscreen can be operable to accept user inputs comprising touching the touchscreen. In some embodiments, the touchscreen can be manually controlled by a user to transmit stimulating light to a certain well of a multi-well plate. The touchscreen may be operable to control all aspects of the microscope, including position of the plate pusher, stimulation light intensity and/or wavelength, or any other factor relevant to the use and control of the plate reader.

Figure 11:
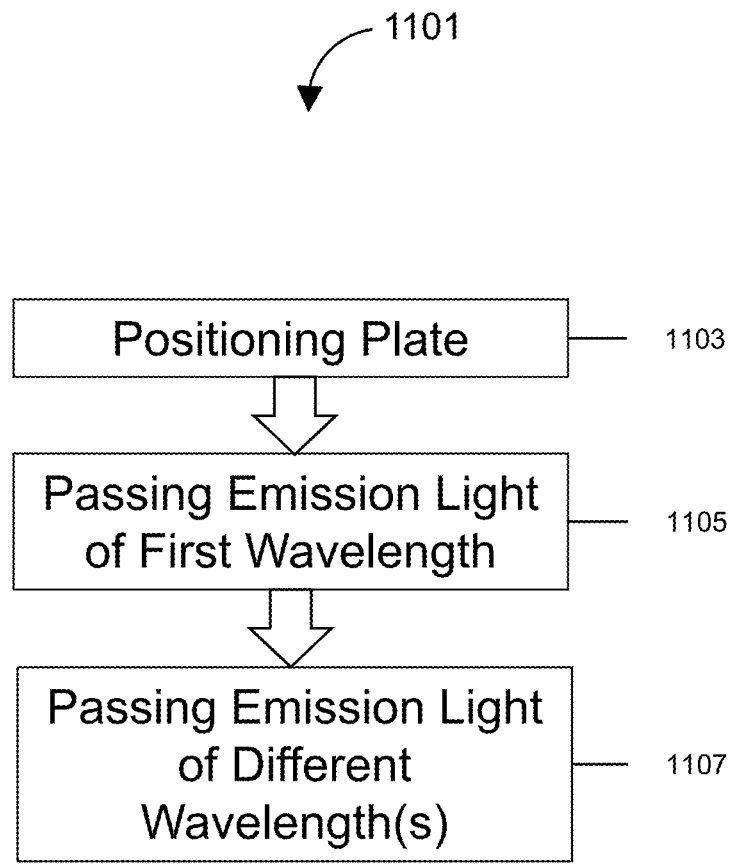
FIG. 11 shows an exemplary method of the invention.

FIG. 11 provides an overview of an exemplary method 1101 for imaging a sample that can be performed using a plate reader of the present invention. The method requires positioning 1103 a multi-well plate containing a biological sample in one or more wells of the plate onto a reading platform of a plate reader such that a well of the plate aligns and is disposed with an objective of the plate reader. The plate may be positioned, for example, using a translational stage or other mechanism that displaces the plate with respect to the objective.

Emission light of a first wavelength is then passed 1105 from the sample in the well, through the aligned objective and along a first optical path of the plate reader to a first light detector. Emission light of a second and/or third wavelength is similarly passed 1107 from the well along a second and/or third optical path to a second and/or third light detector. The light detectors may be photodetectors, such as photodiodes. The optical paths may include a dichroic mirror having at least one defined wavelength.

The emission light may be, for example, from one or more different optical reporters of cellular activity in the sample. The emission light may be indicative of a biological signal in the cells contained in the well of the multi-well plate, such as an action potential or, a synaptic signal, or a change in membrane potential, or a change in intracellular ion concentration and a change in concentration of intracellular mediators.

In certain aspects, the plate reader of the method includes multiple objectives, and emission light of the first and second and/or third wavelengths is passed along optical paths associated the respective objectives.

EXAMPLES

Example 1: IPSC-Derived Cardiomyocyte Validation Assay

A 24 objective plate reader of the invention was used to assay a 96-well plate that contained IPSC-derived cardiomyocyte expressing jRGECO1a calcium sensors, CheRiff actuators, and loaded with BeRST1 fluorescent voltage sensitive dye.

Figure 12A:
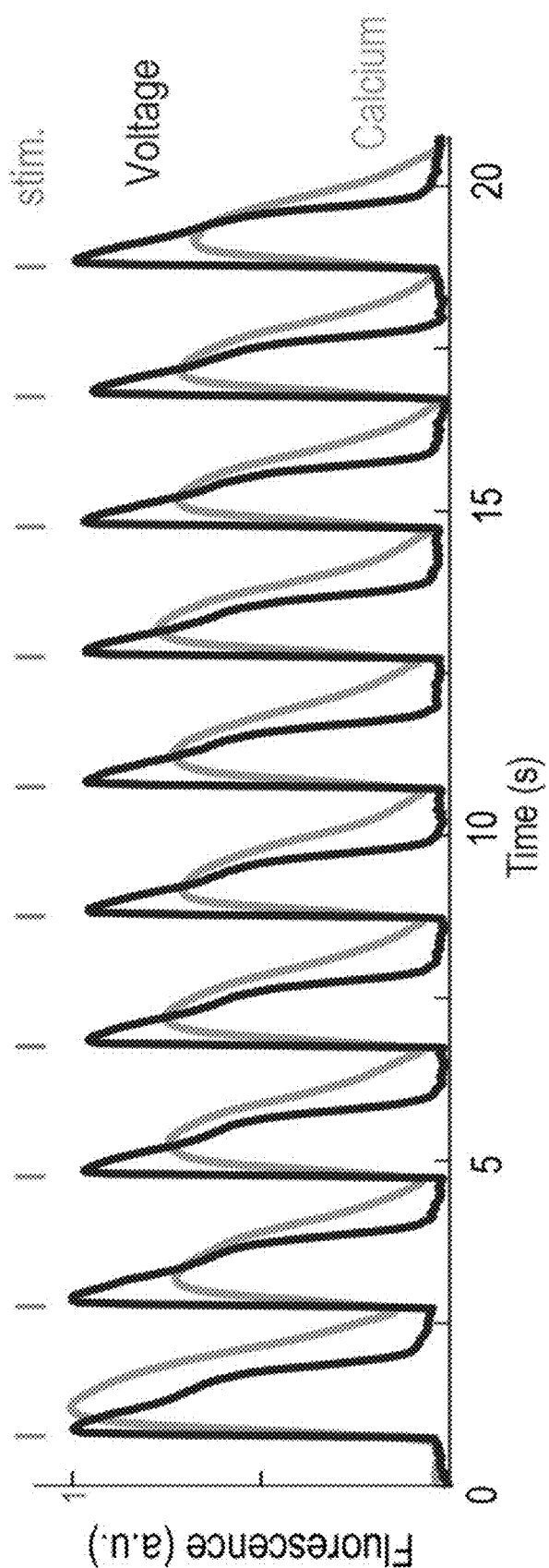
FIG. 12A shows voltage and calcium imaging.

FIG. 12A shows the outcome of the simultaneous voltage and calcium imaging on the Swarm instrument. The line labeled "stim" indicates pulses of stimulating light transmitted by the plate reader to multiple wells of the 96-well plate, which caused actuation of CheRiff. This led to resulting changes in voltage and calcium ion concentrations in the cells. The resulting changes in voltage were reported by BeRST1, which was energized by red light transmitted from the plate reader. Calcium ion concentration was reported by jRGECO1, which was energized by yellow light. Thus, the plate reader was able to accurately stimulate an actuator and two reporters in multiple wells of a multi-well plate with three separate wavelengths of light. Moreover, the plate reader was able to simultaneously detect the levels of two separate emission wavelengths of light.

Figure 12B:
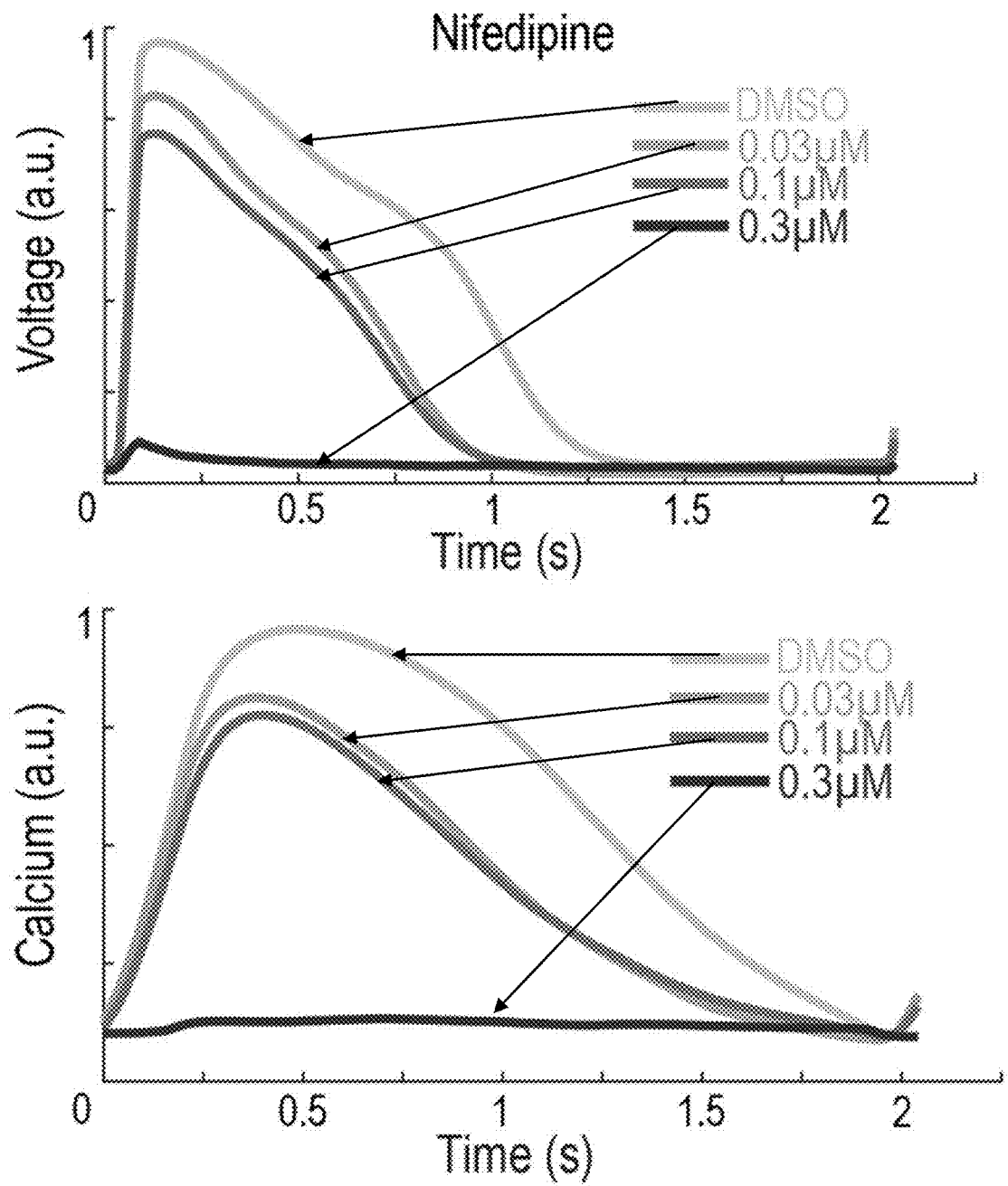
FIG. 12B shows validation of the assay.

FIG. 12B shows validation of the assay with tool pharmacology such as the calcium channel blocker Nifedipine. The voltage and calcium fluorescence waveforms show the average epoch of the 10-test pulse blue stimulation protocol.

Figure 12C:
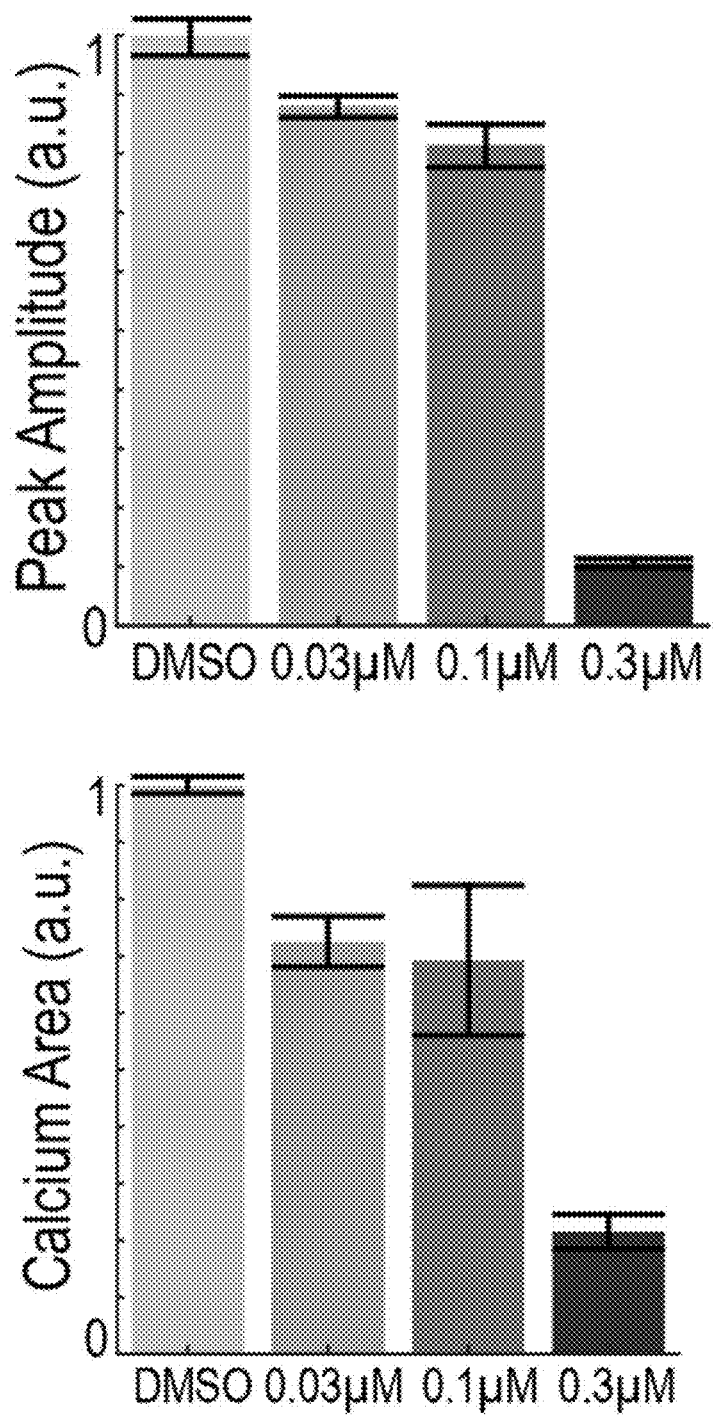
FIG. 12C shows voltage and calcium quantification.

FIG. 12C shows the quantification of the voltage peak amplitude and the integrated calcium area from 3 wells of each concentration. Increasing concentration of Nifedipine altered both the voltage action potential waveform and calcium transients until it was completely extinguished at 0.3 µM.

Example 2: Optical Channel Module Validation Assays

The same plate reader with a single optical channel module was used to assay spiking HEK cells in the wells of a 384-well plate. The plate reader simultaneously assayed one well of the plate at a time—one with each optical channel/objective of the optical channel module addressing one well at a time.

Figure 13:
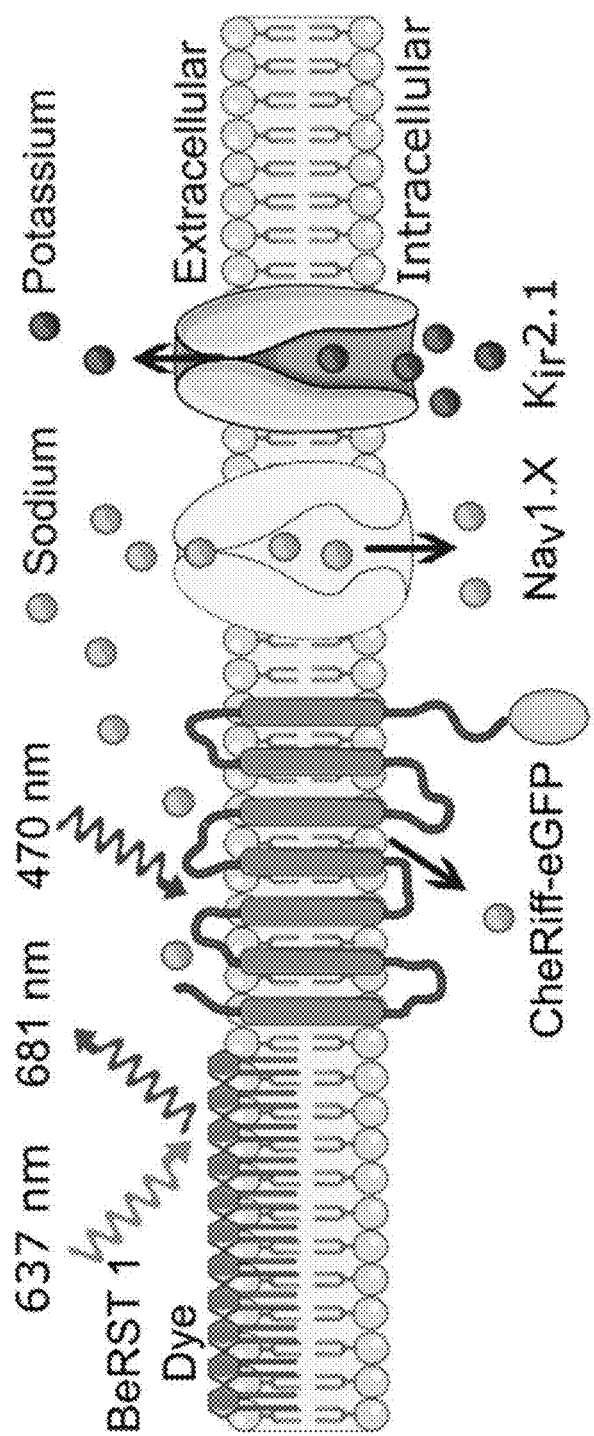
FIG. 13 shows the components of a HEK cell.

FIG. 13 provides a schematic of the spiking HEK cells. The cells were caused to express QuasAr2 as a voltage reporter, CheRiff as a voltage actuator to modulate membrane potential, Kir2.1 as a potassium channel to modulate membrane potential, and a Nav1.x channel (such as Nav1.5, Nav1.7, Nav1.8, Nav1.9, etc.) which is a voltage gated sodium channel. Such assays can be used, for example, to detect different mechanisms and compounds to block the activity of Nav1.x channels, which are targets of interest for reducing pain. In this assay, Nav1.7 was expressed by the cells.

In addition to the cells, each well of the plate had either 185 nM of a known Nav1.7 blocker compound TTX, 5.6 µM amitriptyline, or a vehicle (0.5% DMSO) added. Each optical channel of the optical channel module simultaneously transmitted patterned blue light to a different well of the multi-well plate to stimulate CheRiff until the cells fired an action potential. The stimulation protocol consisted of eight pulses of blue light to measure response of the cells to the added compound, followed by a plateau triggered by the reference stimulus, and then followed by a final transmission of blue light to measure the effect of continuous stimulation.

Figure 14:
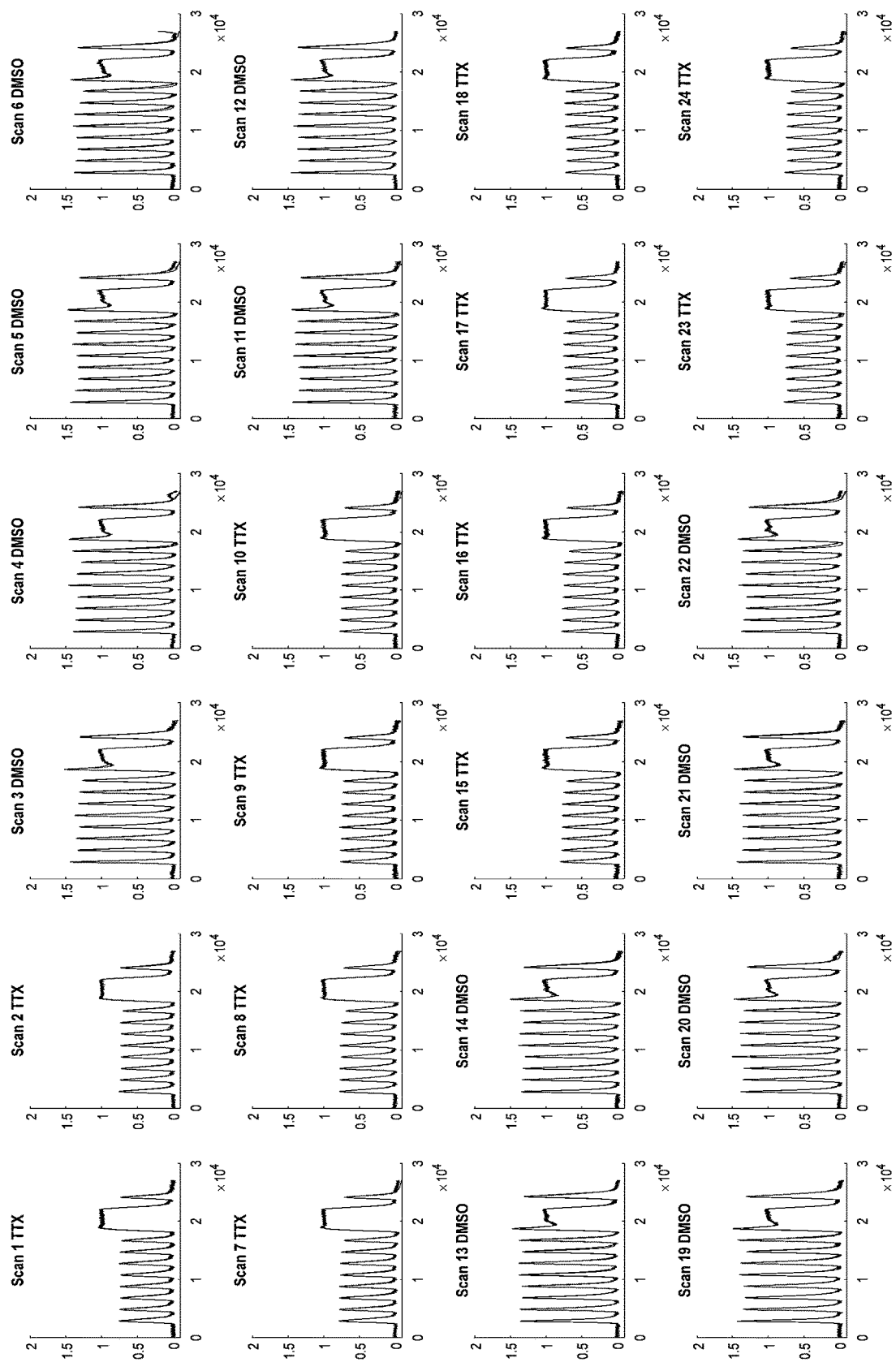
FIG. 14 shows optogenetic assay results obtained by a plate reader of the invention.

FIG. 14 provides representative data from wells assayed by the optical channel module. The blue lines (also called "left well") are the results from one channel of the optical channel module, while the red lines (also called "right well") are the results from the other channel of the module.

Figure 15:
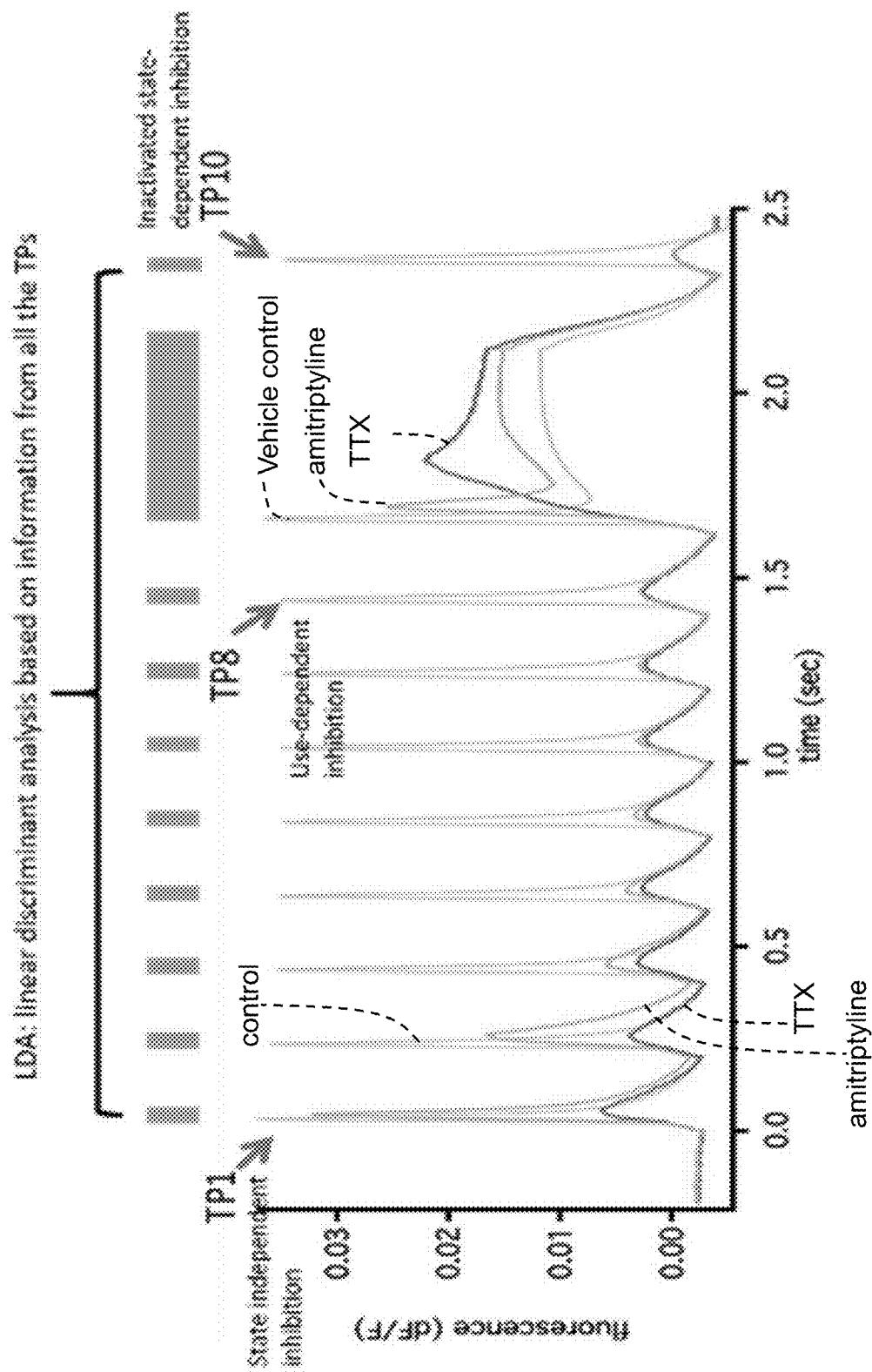
FIG. 15 shows optogenetic assay results obtained by an epi-fluorescent microscope.

FIG. 15 provides results previously obtained and validated results using a similar assay using an epi-fluorescence microscope. It is clear that the results in FIG. 14 from the plate reader conformed to the validated results provided by the microscope.

Figure 16:
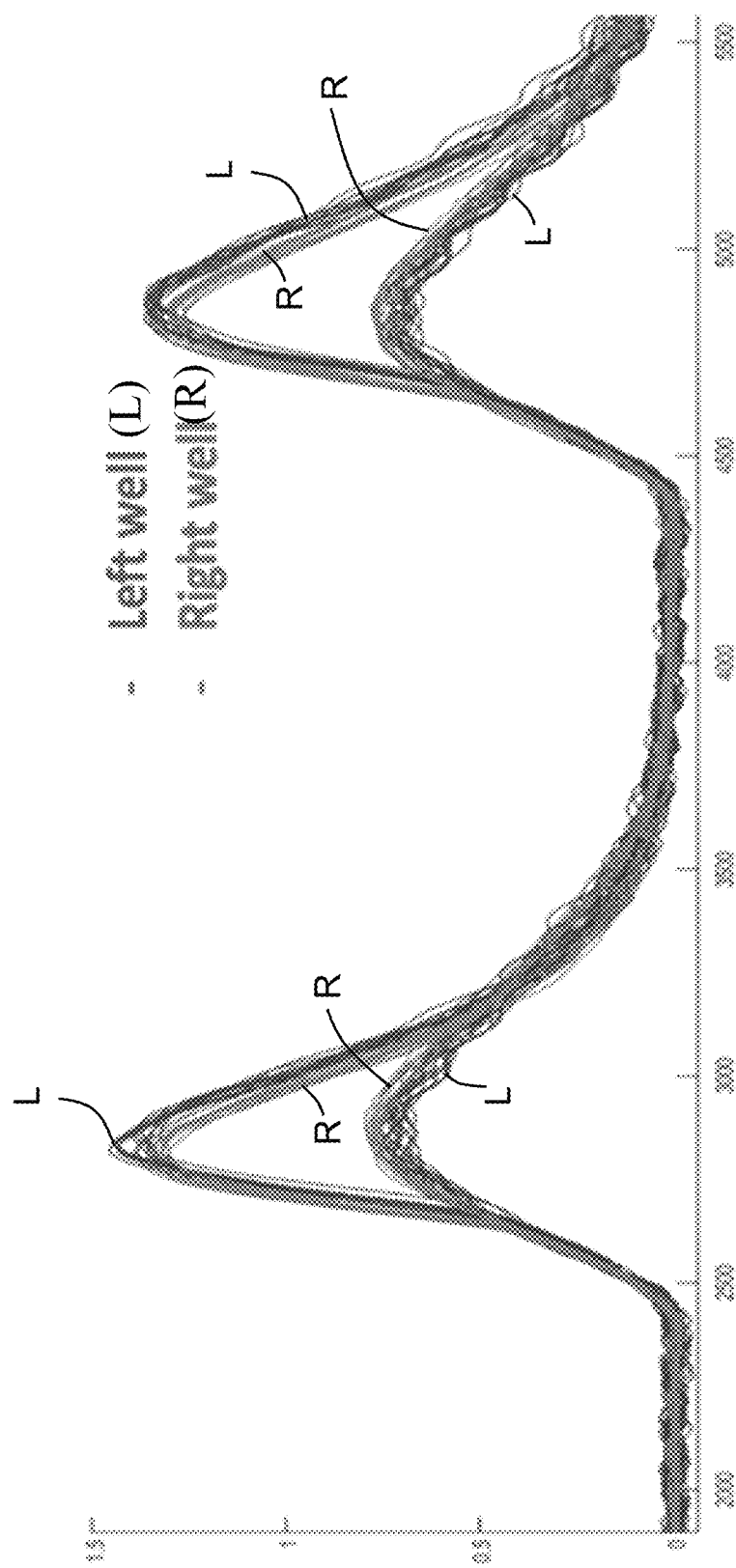
FIG. 16 shows optogenetic assay results obtained by a plate reader of the invention.

FIG. 16 shows an overlay of the results from the first two pulses in each well as detected by each optical channel of the optical channel module. This figure shows that the results from each channel are consistent and repeatable, with only slight differences between each channel.

Figure 17:
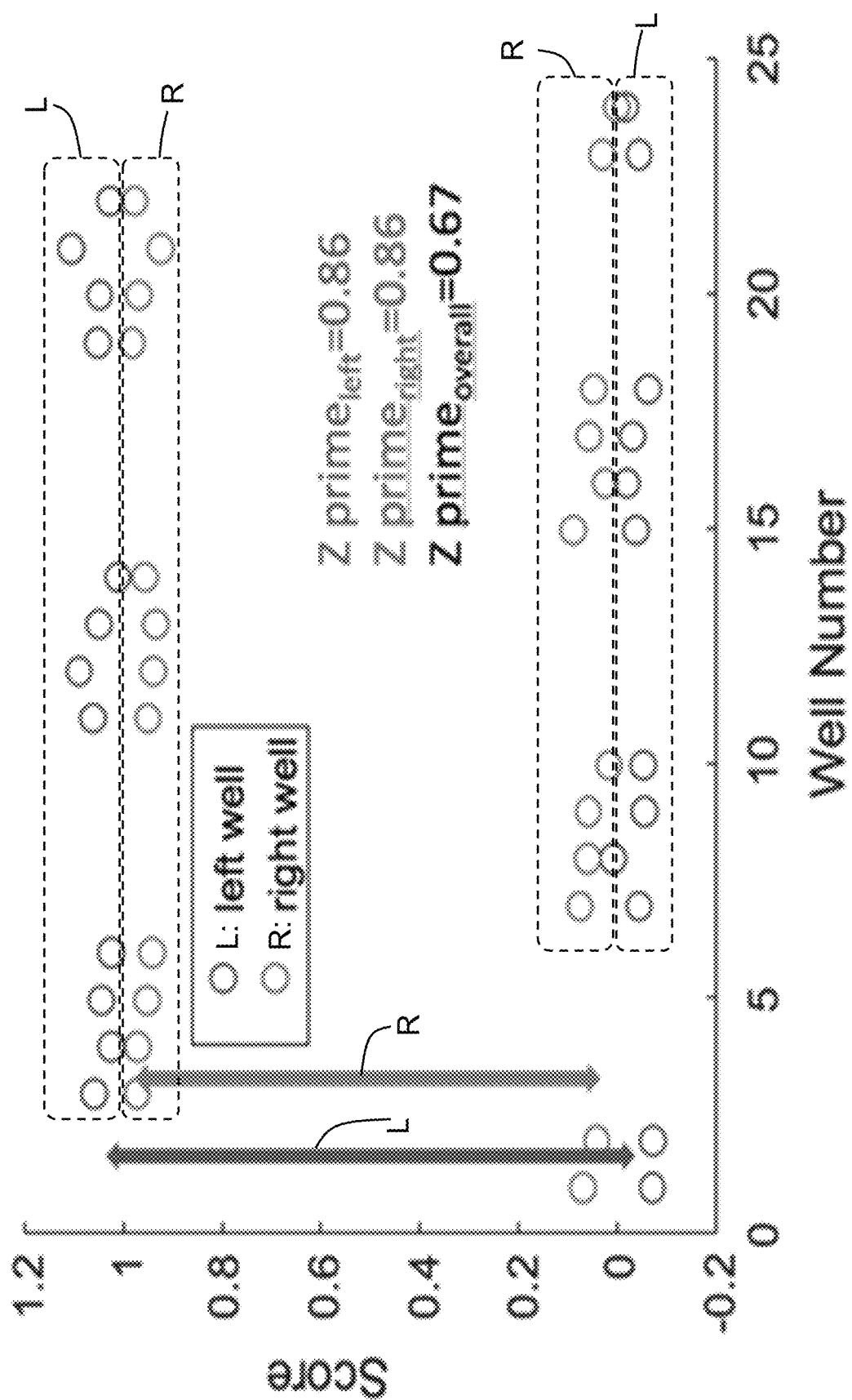
FIG. 17 shows optogenetic assay results obtained by a plate reader of the invention

FIG. 17 provides the summary statistic, Z-prime, calculated for each channel of the module. It is clear based on these results that even with the slight differences between channels, a desirable Z-prime was obtained for these assays.

Example 3: Simultaneous 24-Well Validation Assay

A plate reader with 12 optical-channel modules (i.e., two 12 read heads and 24 optical-channels/objectives) was used to simultaneously assay 24 individual wells of a multi-well plate. The wells of the plate contained OptoPatch system samples. The OptoPatch system is an all-optical electrophysiology system that uses mammalian neurons employed to directly report changes in transmembrane potential with excellent signal-to-noise properties. The neurons in the wells of each plate were caused to express Arch-based QuasArs as voltage reporters and CheRiff as a voltage actuator to modulate membrane potential.

This plate reader can apply stimulation waveforms independently to all four LED wavelengths of each optical-channel to each well with 16-bit resolution and up to 25 kS/s. The output of each of the 72 picoammeter outputs are digitized independently and simultaneously with 24-bit resolution at up to 10 kS/s. This allowed the optical channels to independently transmit stimulation light to the expressed CheRiff and excitation light to the Arch-based QuasArs expressed by the neurons contained in each of the wells. The stimulation light stimulated CheRiff, causing a change in the membrane potential of the neurons. The excitation light excited the QuasArs, which produced an optical signal indicative of the change in action potential caused by stimulation of CheRiff.

Figure 18:
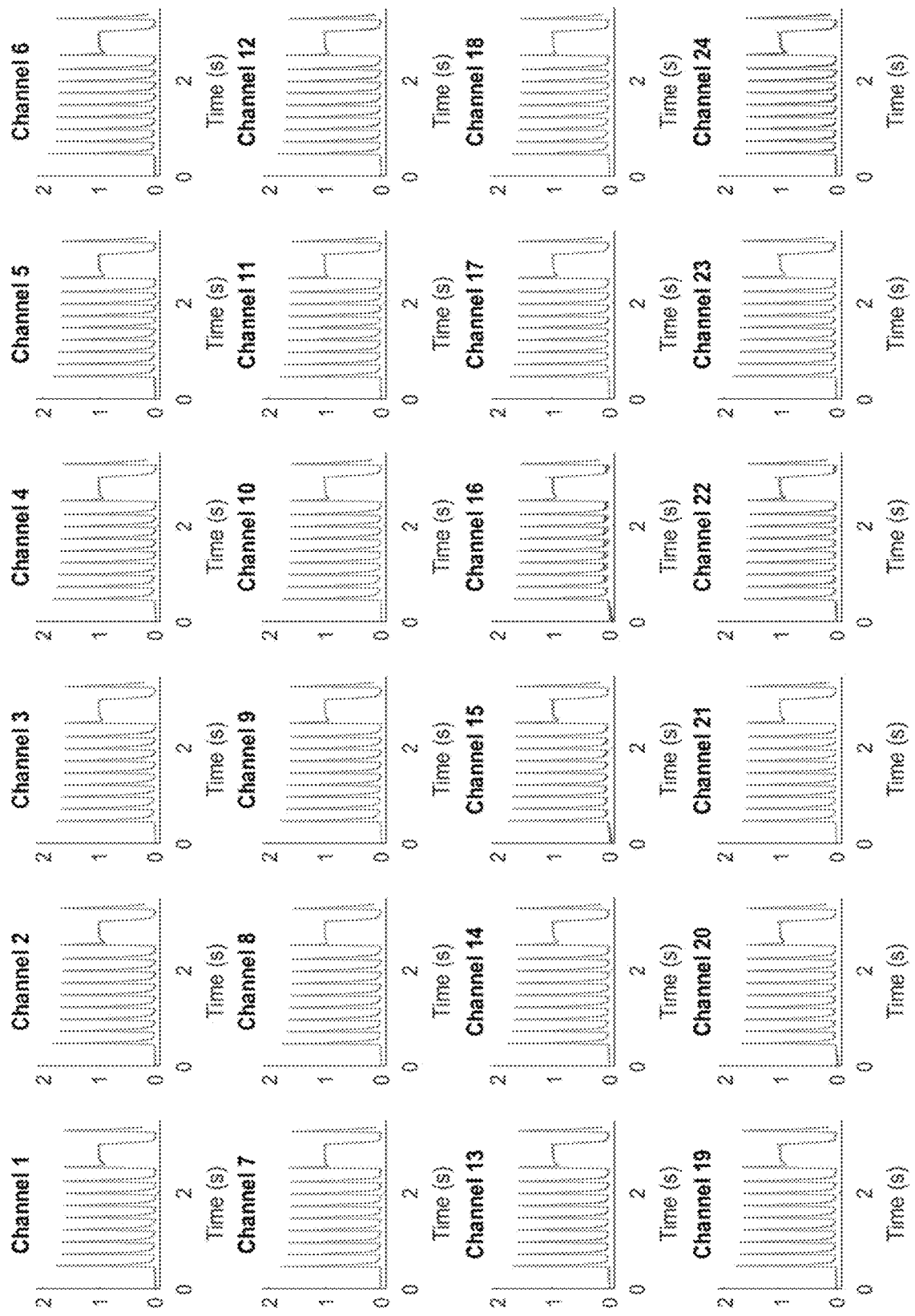
FIG. 18 shows optogenetic assay results obtained by a plate reader of the invention

FIG. 18 provides the results of this assays, which are optical traces recorded using the optical channels aligned at the wells of the multi-well plate. For each optical channel, data from two separate wells are overlaid and shown as blue and magenta line respectively. The imaging frame rate is 2 kilohertz and bleach correction was applied. All the 24 wells optical channels are fully functional and provided consistent, repeatable results.

These results demonstrate that the plate reader of the invention can provide simultaneous, accurate, and repeatable results across several wells of a multi-well plate. Each pulsing protocol takes less than 5 seconds to complete, and it takes approximately 5 seconds to set up control signals and to align the wells of a plate with the objectives. This equates to approximately 5 minutes to change plates and scan a plate on the plate reader. Thus, when using 96-well plates, approximately 7,000 individual wells can be assayed per day. When using 384-well plates this throughput increases to approximately 20,000 wells per day, while 1,536-well plates provide an approximate 40,000 individual wells per day throughput. The plate readers of the invention can thus function in high-throughput screening (HTS) assays.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:
1. A plate reader comprising:
   a sample stage to support a multi-well plate;

one or more optical channel modules each comprising a plurality of optical channels, each optical channel comprising an objective lens capable of transmitting light at a plurality of different wavelengths and capable of detecting light at a plurality of different wavelengths using a different light detector for each different wavelength; and a translational stage that displaces the multi-well plate with respect to the plurality of optical channels to align each of a plurality of wells of the multi-well plate with one of the optical channels, wherein each optical channel transmits light to and detects light from an aligned well.

2. The plate reader of claim 1, wherein simultaneously each of the plurality of optical channels transmits light to and/or detects light from an aligned well.

3. The plate reader of claim 1, wherein each optical channel is capable of transmitting light of at least three distinct wavelengths to an aligned well.

4. The plate reader of claim 1, wherein each optical channel is capable of transmitting light of four distinct wavelengths to an aligned well.

5. The plate reader of claim 3, wherein each optical channel is capable of detecting light of at least three distinct wavelengths from an aligned well.

6. The plate reader of claim 5, wherein each optical channel is capable of detecting light of three or more distinct wavelengths from an aligned well.

7. The plate reader of claim 1, wherein the each of the optical channels transmits light at one or more distinct wavelengths that lead to the stimulation of at least one optical reporter in an aligned well.

8. The plate reader of claim 7, wherein each of the optical channels detects emission light from the at least one optical reporter in the aligned well.

9. The plate reader of claim 8, wherein the optical reporter is a protein in cells in the aligned well.

10. The plate reader of claim 9, wherein the optical reporter is fluorescent reporter of membrane electrical potential, intracellular ion concentration, or concentration of intracellular metabolites or signaling molecules.

11. The plate reader of claim 10, wherein the cells are neurons, muscle, HEK cells, or cardiomyocytes, endocrine cells and engineered cells.

12. The plate reader of claim 11, wherein the cells include optical actuators of electrical activity.

13. The plate reader of claim 12, wherein the optical actuators of electrical activity include one or more light-gated ion channels.

14. The plate reader of claim 13, wherein the light-gated ion channels include one or more algal channelrhodopsins.

15. The plate reader of claim 8, wherein the at least one optical reporter is a fluorescently labeled nucleotide analogue.

16. The plate reader of claim 8, wherein the at least one optical reporter comprises three or more differently labeled nucleotide analogues.

17. The plate reader of claim 16, wherein:
each optical channel is capable of transmitting light of three or more distinct wavelengths to an aligned well, and each distinct wavelength stimulates a different one of the nucleotide analogues;
each optical channel is capable of detecting light of three or more distinct wavelengths from an aligned well, and each distinct wavelength is an emission from one of the nucleotide analogues.

18. The plate reader of claim 1, wherein each optical channel further comprises one of more dichroic mirrors configured such that each different wavelength of light detected by an optical channel passes through the objective and along a different optical path to the respective different light detector for that wavelength.

* * * * *